United States Patent
Al-Saleh

(10) Patent No.: US 9,720,119 B2
(45) Date of Patent: *Aug. 1, 2017

(54) SEISMIC IMAGE FILTERING MACHINE TO GENERATE A FILTERED SEISMIC IMAGE, PROGRAM PRODUCTS, AND RELATED METHODS

(71) Applicant: Saudi Arabian Oil Company, Dhahran (SA)

(72) Inventor: Saleh M. Al-Saleh, Dhahran (SA)

(73) Assignee: Saudi Arabian Oil Company, Dhahra (SA)

( * ) Notice: Subject to any disclaimer, the term of this patent is extended or adjusted under 35 U.S.C. 154(b) by 559 days.

This patent is subject to a terminal disclaimer.

(21) Appl. No.: 14/275,971

(22) Filed: May 13, 2014

(65) Prior Publication Data

US 2014/0249759 A1    Sep. 4, 2014

Related U.S. Application Data

(63) Continuation of application No. 13/681,207, filed on Nov. 19, 2012, now Pat. No. 8,762,064, which is a
(Continued)

(51) Int. Cl.
G01V 1/34 (2006.01)
G01V 1/36 (2006.01)
G06T 11/20 (2006.01)

(52) U.S. Cl.
CPC .............. *G01V 1/345* (2013.01); *G01V 1/34* (2013.01); *G01V 1/364* (2013.01); *G06T 11/206* (2013.01);
(Continued)

(58) Field of Classification Search
CPC ................................. G01V 1/34; G01V 1/345
(Continued)

(56) References Cited

U.S. PATENT DOCUMENTS 3,370,268 A    2/1968 Dobrin
3,512,127 A    5/1970 Burg
(Continued)

FOREIGN PATENT DOCUMENTS

FR    2666905    3/1992
FR    2923312    5/2009
(Continued)

OTHER PUBLICATIONS

Douglas I. Hart et al., "Improving the reliability of first-break picking with neural networks," SEG Expanded, Abstracts 15; Nov. 1996; pp. 1662-1665.
(Continued)

*Primary Examiner* — Ricky Ngon
(74) *Attorney, Agent, or Firm* — Bracewell LLP; Constance G. Rhebergen; Brian H. Tompkins

(57) ABSTRACT

Seismic image filtering machines, systems, program products, and computer implemented methods are provided to generate a filtered seismic image responsive to filtered seismic image data generated by attenuating coherent seismic noise from surface waves of an unfiltered wavefield constructed from unfiltered seismic image data through a single downward extrapolation of the unfiltered wavefield using a plurality of nonstationary convolution operators to perform localized filtering at each of a plurality of spatial locations of the unfiltered wavefield. Various embodiments, for example, can beneficially handle strong lateral velocity variations thus making various embodiments effective tools to remove complicated coherent seismic noise which is typically in the form of exponentially decaying evanescent waves. Embodiments of the present invention, for example, can use, as a part of the filtering mechanism, specially designed nonstationary convolution operators that are
(Continued)

implemented in the space-frequency domain as nonstationary filters.

24 Claims, 16 Drawing Sheets

Related U.S. Application Data continuation of application No. 12/608,519, filed on Oct. 29, 2009, now Pat. No. 8,321,134.

(60) Provisional application No. 61/110,214, filed on Oct. 31, 2008.

(52) U.S. Cl.
CPC ............. G01V 2210/324 (2013.01); G01V 2210/3246 (2013.01); G01V 2210/74 (2013.01)

(58) Field of Classification Search
USPC .......................................................... 702/17
See application file for complete search history.

(56) References Cited

U.S. PATENT DOCUMENTS

| | | | |
|---|---|---|---|
| 3,766,519 A | 10/1973 | Stephenson | |
| 4,758,998 A | 7/1988 | Johnson | |
| 4,884,248 A | 11/1989 | Laster | |
| 4,964,098 A | 10/1990 | Hornbostel | |
| 5,067,112 A | 11/1991 | Meek | |
| 5,073,876 A | 12/1991 | Propes | |
| 5,103,429 A | 4/1992 | Gelchinsky | |
| 5,138,583 A | 8/1992 | Wason | |
| 5,173,880 A | 12/1992 | Duren | |
| 5,191,526 A | 3/1993 | Laster et al. | |
| 5,392,213 A | 2/1995 | Houston | |
| 5,448,531 A | 9/1995 | Dragoset, Jr. | |
| 5,459,668 A | 10/1995 | Dogan | |
| 5,570,305 A | 10/1996 | Fattouche | |
| 5,696,734 A | 12/1997 | Corrigan | |
| 6,026,059 A | 2/2000 | Starr | |
| 6,151,275 A | 11/2000 | Starr | |
| 6,154,705 A | 11/2000 | McCormack | |
| 6,263,285 B1 | 7/2001 | Starr | |
| 6,501,703 B2 | 12/2002 | Zhou | |
| 6,556,922 B2* | 4/2003 | Anno | G01V 1/364 702/17 |
| 6,598,001 B1 | 7/2003 | Deflandre | |
| 6,678,207 B2 | 1/2004 | Duren | |
| 6,704,657 B2 | 3/2004 | Peng | |
| 6,735,527 B1 | 5/2004 | Levin | |
| 6,751,559 B2 | 6/2004 | Fookes | |
| 6,867,731 B2 | 3/2005 | Dizaji | |
| 6,961,283 B2 | 11/2005 | Kappius | |
| 6,985,815 B2* | 1/2006 | Castagna | G01V 1/364 175/1 |
| 7,035,737 B2* | 4/2006 | Ren | G01V 1/28 702/17 |
| 7,400,553 B1 | 7/2008 | Jin | |
| 7,418,349 B2 | 8/2008 | Robertsson | |
| 7,423,930 B2 | 9/2008 | Valero | |
| 7,453,765 B2 | 11/2008 | Ikelle | |
| 7,616,524 B1* | 11/2009 | Gersztenkorn | G01V 1/30 367/38 |
| 7,636,275 B2* | 12/2009 | Anno | G01V 1/308 367/21 |
| 7,751,277 B2* | 7/2010 | Schonewille | G01V 1/36 367/38 |
| 7,881,911 B2* | 2/2011 | Kim | G01V 11/00 367/25 |
| 8,321,134 B2* | 11/2012 | Al-Saleh | G01V 1/364 702/14 |
| 8,762,064 B2* | 6/2014 | Al-Saleh | G01V 1/364 702/14 |
| 2006/0050611 A1 | 3/2006 | Borresen | |
| 2007/0255501 A1 | 11/2007 | Kellogg | |
| 2007/0274155 A1 | 11/2007 | Ikelle | |
| 2008/0033655 A1 | 2/2008 | Ozbek et al. | |
| 2008/0106974 A1 | 5/2008 | Bergery | |
| 2009/0034756 A1 | 2/2009 | Volker et al. | |
| 2009/0093964 A1 | 4/2009 | Albera | |
| 2009/0222211 A1 | 9/2009 | Burnstad et al. | |

FOREIGN PATENT DOCUMENTS

| | | |
|---|---|---|
| WO | 02095449 | 11/2002 |
| WO | 2009059951 | 5/2009 |

OTHER PUBLICATIONS

International Search Report with Written Opinion issued in related PCT Patent Application No. PCT/US2009/062466; dated Mar. 9, 2010; 8 pages.

E.B. Davies et al., "Multichannel Deconvolution Filtering of Field Recorded Seismic Data," Geophysics, vol. 33, No. 5; Oct. 1968; pp. 711-722.

International Search Report with Written Opinion issued in related PCT Patent Application No. PCT/US2009/035432; dated Sep. 11, 2009; 17 pages.

Larry Morley et al., "Predictive deconvolution in shot-receiver space," Geophysics, vol. 48, No. 5; May 1983; pp. 515-531.

Stewart A. Levin, "Surface-consistent deconvolution," Geophysics, vol. 54, No. 9; Sep. 1989; pp. 1123-1133.

Guillaume Cambois et al. "Surface-consistent phase decomposition in the log/Fourier domain," Geophysics, vol. 58, No. 8; Aug. 1993; pp. 1099-1111.

B. Buttkus et al., "Enhancement of Deep Seismic reflections in Pre-Stack Data by Adaptive Filtering," SAO/NASA ADS Physics Abstract Service; 1999; http://adsabs.harvard.edu.

Fabio Boschetti et al., "A fractal-based algorithm for detecting first arrivals on seismic traces," Geophysics, vol. 61. No. 4; Jul.-Aug. 1996; pp. 1095-1102.

F. Coppens, "First Arrival Picking on Common-Offset Trace Collections for Automatic Estimation of Static Corrections," Geophysical Prospecting, vol. 33, Issue 8; Dec. 1985; pp. 1212-1231.

Douglas I. Hart, Improving the Reliability of First Break Picking with Neural Networks,: SEG Expanded, Abstracts 15; pp. 1662-1665.

Mithat C. Dogan et al., "Applications of Cumulants to Array Processing—Part I: Aperture Extension and Array Calibration," IEEE Transactions on Signal Processing, vol. 43, No. 5; May 1995; pp. 1200-1216.

* cited by examiner

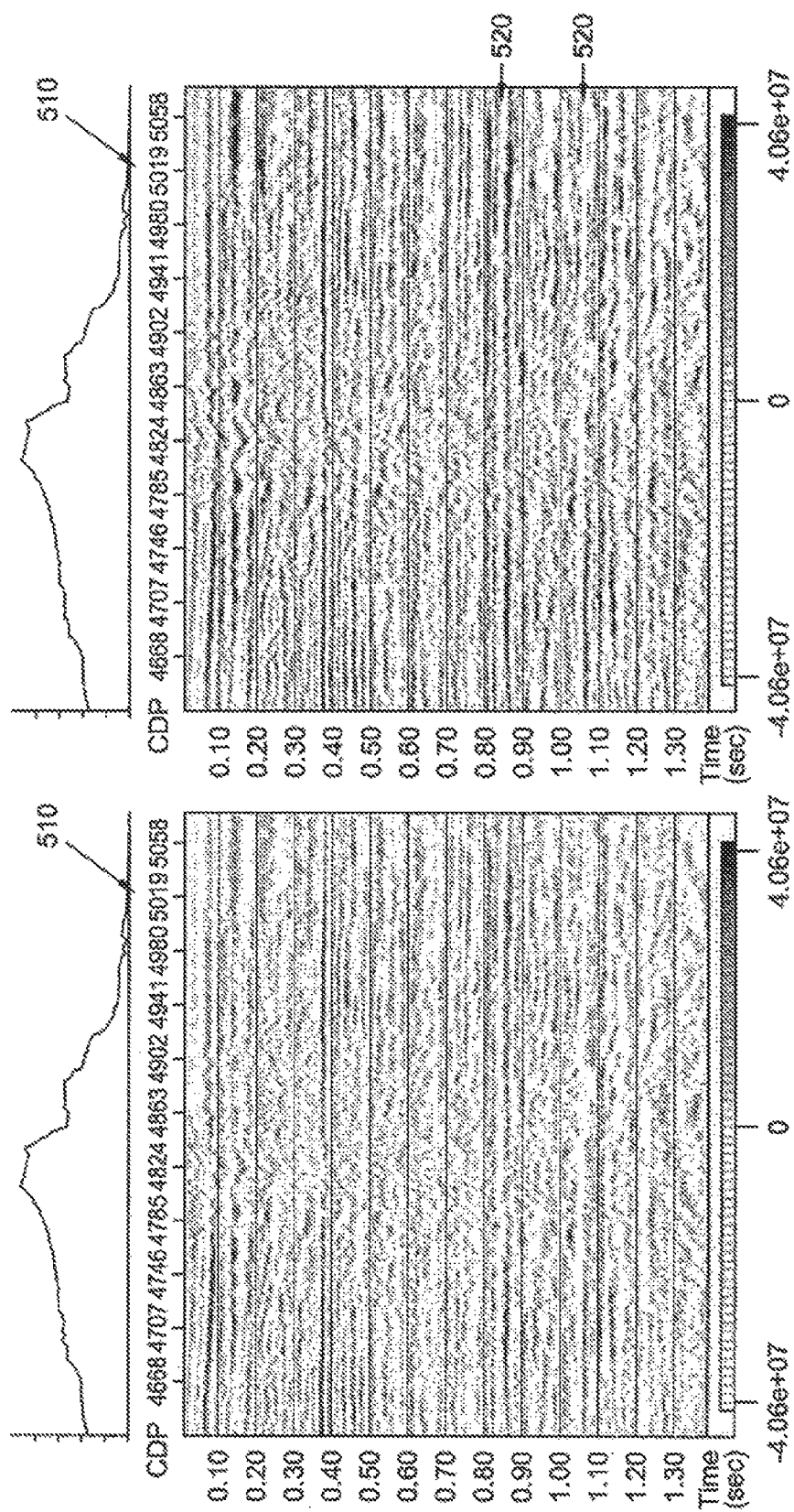

SEISMIC IMAGE FILTERING MACHINE TO GENERATE A FILTERED SEISMIC IMAGE, PROGRAM PRODUCTS, AND RELATED METHODS

RELATED APPLICATIONS

This application is a continuation application of and claims priority to U.S. patent application Ser. No. 13/681,207 titled "Seismic Image Filtering Machine to Generate a Filtered Seismic Image, Program Products, and Related Methods" and filed Nov. 19, 2012, which is a continuation application of and claims priority to U.S. patent application Ser. No. 12/608,519, now U.S. Pat. No. 8,321,134, titled "Seismic Image Filtering Machine to Generate a Filtered Seismic Image, Program Products, and Related Methods" and filed Oct. 29, 2009, which claims priority to and claims the benefit of U.S. Provisional Patent Application Ser. No. 61/110,214 titled "System and Program Product to Attenuate Coherent Seismic Noise from Surface Waves Using Nonstationary Filters and Associated Methods" and filed Oct. 31, 2008, all of which are incorporated herein by reference in their entirety.

BACKGROUND OF THE INVENTION

1. Field of the Invention

The invention generally relates to the field of geophysical subsurface seismic imaging in the field of geophysical seismic exploration. More specifically, this invention generally relates to machines, program products, and methods to generate filtered seismic images based on seismic image data filtered by attenuating coherent noise from unfiltered seismic image data using a plurality of nonstationary convolution operators as local filters at each spatial location of an unfiltered seismic image wavefield.

2. Description of Related Art

In the oil and gas industry, geophysical seismic data processing and analysis techniques are commonly used to aid in the search for, and evaluation of, subterranean hydrocarbon deposits. In many instances, a seismic energy source can be used to generate seismic energy signals that propagate into the earth and are, at least partially, reflected by subsurface seismic reflectors such as interfaces between underground formations having different acoustic impedances. Such seismic energy reflections can subsequently be recorded in a geophysical time series by seismic energy detectors, sensors, or receivers positioned at a recording surface located at or near the surface of the earth, in a body of water, or at known depths in boreholes. The resulting seismic data then can be processed and analyzed to yield information relating to the location of the subsurface reflectors and the physical properties of the subsurface formations.

Processed seismic data, in the form of surface waves delineating a wavefield, can be useful in delineating and mapping the earth's subsurface features. Geophysical time series data acquired in the field, however, often contains undesired dispersive energy, such as coherent seismic noise, as well as desired seismic energy. Such unwanted coherent seismic noise can interfere with, overwhelm, or otherwise mask desired seismic energy useful for subsurface explorations. Particularly, when propagating through an irregular surface or complex near surface, such as, rugged topography or complex geology, surface waves can have complicated wave paths and lateral velocity variations resulting in unwanted dispersive energy. Much of this energy propagates horizontally in the near surface of a wavefield. In the presence of complex geology or rugged topography, this energy can have a complicated wave path, thus making its removal a challenging task. Nevertheless, removing this dispersive energy is an important and beneficial step that is necessary, in many cases, to focus the subsurface seismic image so that it can be used for accurate and cost-effective subsurface exploration.

Current solutions attenuate unwanted dispersive energy and coherent seismic noise from seismic image data by downwardly continuing the seismic data wavefield through a data extrapolation to a depth level below the propagation zone of the surface waves followed by an upward continuation, or extrapolation of the data, back up to the seismic data recording surface. Other current solutions attenuate noise by upwardly continuing the seismic image wavefield through a data extrapolation to a depth level above the highest elevation followed by a downward continuation, or extrapolation of the data, back to the recording surface. Both approaches can be at least marginally effective (albeit inefficient) because the seismic imaging surface waves often manifest themselves as evanescent waves which exhibit exponential decay with distance and are therefore capable of being filtered out during the wavefield extrapolation.

SUMMARY OF THE INVENTION

Accordingly, as subsurface imaging becomes of even greater importance to energy companies as they strive to tap the potential of more remote mineral deposits, applicants recognize a need for a more efficient and computationally inexpensive process for attenuating coherent seismic noise from surface waves. Because previous methods require forward and inverse extrapolation of the data and the data must be sorted between the source and receiver domains for each extrapolation, such previous methods were recognized by applicants as inefficient and computationally expensive. Particularly, applicants recognize a need for various machines, systems, computer implemented methods, and program products to generate a filtered seismic image based on filtered seismic image data that has been filtered according to various embodiments of the present invention.

Generally, seismic imaging directs an intense sound from a seismic energy source device into the ground to evaluate subsurface conditions and to detect possible concentrations of oil, gas, and other subsurface minerals. Seismic image receiver devices, known as geophones, record sound wave echoes that come back up through the ground to the recording surface. Such seismic image receiver devices, or geophones, can record the intensity of such sound waves and the time it took for the sound wave to travel from the sound source device back to the geophone recording device at the recording surface. According to various exemplary embodiments of the present invention, for example, during the seismic imaging process, the reflections of sound waves emitted by the sound source device, and recorded by the geophone recording device, can be processed by a computer to generate a three-dimensional digital model, or seismic image, of the subsurface. The three-dimensional model of the subsurface can be used to identify, for example, the placement of wells and potential well flow paths.

More specifically, according to an exemplary embodiment of the present invention, a seismic energy receiver can be positioned to receive and record seismic energy data or seismic field records in any form including a geophysical time series recording of the acoustic reflection and refraction of waveforms that travel from the seismic energy source to the seismic energy receiver. Variations in the travel times of reflection and refraction events in one or more field records in a plurality of seismic signals can, for example, when processed by a computer, produce a seismic image, defined by unfiltered seismic image data, that demonstrates subsurface structure. The seismic image, however, is unfiltered and accordingly, it may, in many instances, contain not only seismic image data but also complicated coherent seismic noise in the form of evanescent waves as known and understood by those skilled in the art. Such complicated coherent seismic noise with respect to an unfiltered seismic image is similar to fuzz or grain on a image taken with a film camera. By applying certain filters to the film image, it is possible, in many instances, to remove such fuzz or grain. The same is true for complicated coherent seismic noise present in an unfiltered seismic image. Accordingly, prior to using a seismic image to aid in the search for, and exploitation of, mineral deposits, the seismic image should first be filtered according to an exemplary embodiment of the present invention.

According to various embodiments of the present invention, the unfiltered seismic image data can be filtered by attenuating coherent seismic noise from surface waves in a manner that requires fewer extrapolation processes and fewer sorting operations thereby resulting in a faster and more efficient attenuation of complicated coherent seismic noise. Such an advancement would beneficially allow energy companies to explore greater regions of the subsurface terrain in a more cost effective manner thereby allowing such companies to find and obtain vast quantities of undiscovered oil and gas that could ultimately be delivered to consumers at low cost. Computationally efficient seismic image filtering, as provided through various embodiments of the present invention, may beneficially raise the supply of oil thereby lowering the price at the pump for consumers worldwide.

In view of the foregoing, embodiments of the present invention advantageously provide, for example, seismic image filtering machines, systems, computer implemented methods, and computer readable program products, stored in a tangible computer readable storage medium, to generate a filtered seismic image based on seismic image data filtered by attenuating coherent seismic noise from surface waves using a plurality of nonstationary convolution operators, as is known and understood in the art, as local filters that require only a single extrapolation process, which can be implemented either in the source or receiver domain, and which do not require sorting operations. Conceptionally, convolution, as is known and understood by those skilled in the art, can be described as the process of replacing each point of data of an unfiltered image by a scaled copy of a convolution filter. Commonly, convolution operators (or filters), as is known and understood in the art, are stationary, meaning that the operator's form does not change with space or time. While such stationary convolution operators accurately filter more traditional images, a stationary convolution operator's inability to change its form with space or time (i.e., velocity) is often too limiting to accurately filter geophysical seismic images.

Particularly, unfiltered seismic image data can be used to construct, by a computer, an unfiltered wavefield including a plurality of wavelets and delineated by a plurality of spatial locations as is known and understood by those skilled in the art. The velocity of various spatial locations within such an unfiltered wavefield can vary from spatial location to spatial location and as such, stationary convolution operators are unable to provide the needed flexibility. A mathematical process which can form a scaled superposition of a filter while allowing the wavelet radius to depend on a local velocity at a spatial location of within a wavefield is known and understood by those skilled in the art as a nonstationary convolution. Beneficially, and unlike stationary convolution operators, nonstationary convolution operators according to various exemplary embodiments of the present invention can change form, for example, in a controlled fashion with time and space. That is, nonstationary convolution operators can beneficially be, for example, dependent on velocity measurements at various spatial locations of an unfiltered wavefield formed from unfiltered seismic image defined by a plurality of unfiltered seismic image data according to various exemplary embodiments of the present invention. Thus, such nonstationary convolution operators can, for example, be used to filter an unfiltered seismic image to thereby generate a filtered seismic image.

Accordingly, various embodiments of the invention, for example, can beneficially handle strong lateral velocity variations, thus making various embodiments of the present invention effective tools to remove complicated coherent seismic noise typically in the form of exponentially decaying evanescent waves. Embodiments of the present invention, for example, use, as a part of the filtering mechanism, specially designed nonstationary convolution operators that are implemented in the space-frequency domain as nonstationary filters. According to various embodiments of the present invention, such nonstationary convolution operators can be constructed at each of the plurality of spatial locations of an unsorted wavefield so that each of the plurality of spatial locations of the unsorted wavefield can be locally filtered in a single extrapolation process.

Generally, according to exemplary embodiments of the present invention a nonstationary seismic image data filter can be implemented in the space-frequency domain to filter such seismic image data. Such a nonstationary seismic image data filter can include, for example, a nonstationary convolution operator designed using a weighted least squares with a transition band approach, as is known and understood by those skilled in the art, that is configured to attenuate coherent seismic energy, or noise, from the seismic image. The nonstationary seismic image data filter, according to various embodiments of the present invention, can operate by applying a nonstationary convolution operator to downwardly continue the unfiltered seismic image data to a depth level below a surface wave propagation zone of the seismic energy, as is known and understood by those skilled in the art, to thereby produce filtered seismic image data that, when processed by a computer produces a filtered seismic image on a display adapted to be in communication with the computer. A display, according to various embodiments of the present invention, can include a CRT monitor, a LCD monitor, a plasma monitor, a OLED screen, a television, a DLP monitor, a video projection, a three-dimensional projection, a touch screen, and any other graphical user interface device now or herein after developed as is known or understood by those skilled in the art.

Generally, images of various types, including both filtered and unfiltered seismic images, can be represented by a plurality of data points typically in the form of an image matrix as is known and understood by those skilled in the art. Such an image matrix can be processed and manipulated by a computer in order to produce a human-readable version of the image represented by the plurality of image data points on a display adapted to be in communication with the computer. Accordingly, embodiments of the present invention can, for example, beneficially produce a filtered seismic image on a display adapted to be in communication with a computer responsive to attenuating coherent seismic noise from an unfiltered seismic image using a plurality of nonstationary convolution operators as local filters.

Beneficially, for example, the nonstationary seismic image data filter can filter the unfiltered seismic image through only a single downward extrapolation process and without the need to sort the unfiltered seismic image data. When compared to other filter configurations which require multiple data extrapolation processes and a sorted data set, the embodied filter enhances the speed and efficiency of current seismic filters by reducing the process steps necessary to filter a seismic image. Additionally, the nonstationary seismic image data filter can handle strong lateral velocity variation thereby making it an effective tool to remove complicated coherent noise due to complex geology or rugged topography. Generally, the nonstationary seismic image data filter can be, for example, derived from the space-frequency explicit wavefield extrapolation imaging algorithm. At each lateral spatial location, the velocity information of the seismic energy signal can be used to build nonstationary convolution operators which perform localized filtering in the space-frequency domain. Such a configuration, according to exemplary embodiments of the present invention, can use the same velocity model used for resolving near surface distortions.

According to exemplary embodiments of the present invention, a plurality of seismic signals can be generated using a seismic energy source that propagates into the earth and is at least partially reflected by subsurface seismic reflectors, such as interfaces between underground formations having different acoustic impedances. The reflections and refractions of the seismic signals can be received by one or more sensors and recorded by a computer or data processor in geophysical time series by seismic energy receivers located at or near the surface of the earth, in a body of water, or at known depths in boreholes. The recorded seismic signals can then, for example, be converted into unfiltered seismic image data. The unfiltered seismic image data can, when processed by a computer, for example, produce an unfiltered seismic image on a display adapted to be in communication with the computer. The plurality of unfiltered seismic image data can then, according to exemplary embodiments of the present invention, be transmitted to a nonstationary seismic image data filter implemented in the space-frequency domain where the unfiltered seismic image data can be extrapolated to create new filtered seismic image data by applying a nonstationary convolution operator to downwardly continue the unfiltered seismic image data to a depth level below a surface wave propagation zone as is known and understood by those skilled in the art. The nonstationary convolution operator, for example, can be designed using a weighted least-squares with a transition band approach as is known and understood by those skilled in the art. The new filtered seismic image data can be subsequently processed by a computer and provided to a display adapted to be in communication with the computer such that a filtered seismic image is displayed on the display responsive to a seismic image filtering process according to various exemplary embodiments of the present invention.

Beneficially, for example, the nonstationary seismic image data filter can filter the unfiltered seismic image through only a single downward extrapolation process and without the need to sort the unfiltered seismic image data. Other filter configurations, for example, require multiple data extrapolation processes and a sorted data set. A filter of this embodiment, for example, enhances the speed and efficiency of current seismic filters by reducing the process steps necessary to filter the data. Accordingly, embodiments of the present invention, for example, achieve greater efficiency than other methods while still producing a high-quality, accurate, filtered seismic image.

More particularly, an exemplary embodiment of the present invention provides a seismic image filtering machine to create a filtered seismic image responsive to filtered seismic image data generated by attenuating coherent seismic noise from surface waves of an unfiltered wavefield constructed from unfiltered seismic image data through a single downward extrapolation using a plurality of nonstationary convolution operators to perform localized filtering at each of a plurality of spatial locations of the unfiltered wavefield. Such a seismic image filtering machine, according to an exemplary embodiment of the present invention, can beneficially include a database configured to store unfiltered, unsorted seismic image data, a computer adapted to be in communication with the first database and having at least a processor and memory, and various computer readable program products stored in tangible computer readable storage mediums. According to an exemplary embodiment of the present invention, the unfiltered, unsorted seismic image data can be derived from a plurality of seismic energy signals received from a seismic energy receiver at a recording surface once such signals have propagated throughout a surface wave propagation zone as is known and understood by those skilled in the art.

Furthermore, according to various embodiments of the present invention, the aforementioned various computer readable program products can beneficially include, for example, an unfiltered wavefield constructor computer readable program product, a nonstationary convolution operator builder computer readable program product, a localized filter computer readable program product, and a filtered seismic image creator computer readable program product. The unfiltered wavefield constructor computer readable program product can be stored in a tangible computer readable storage medium and can, for example, include instructions that, when executed by the computer, cause the computer to perform the operation of constructing an unfiltered wavefield delineated by a plurality of spatial locations from the unfiltered, unsorted seismic image data stored in the first database. Additionally, the nonstationary convolution operator builder computer readable program product, can include, for example, instructions that when executed by the computer, cause the computer to perform the operation of building, responsive to the unfiltered wavefield constructer computer readable program product, a plurality of nonstationary convolution operators, one for each of the plurality of spatial locations of the unfiltered wavefield. Each of the nonstationary convolution operators can be beneficially based, for example, on the coordinate location of each of the plurality of spatial locations of the unfiltered wavefield and the space-variant velocity, temporal frequency, transverse wavenumber, and wavelength of the unfiltered wavefield at each spatial location.

Also, according to an exemplary embodiment of the present invention, the localized filter computer readable program product can beneficially include instructions that, when executed by the computer, cause the computer to perform the operation of locally filtering each of the plurality of spatial locations of the unfiltered wavefield using, at each spatial locations, at least one of the plurality of nonstationary convolutions operators associated with that one of the plurality of spatial locations to thereby effectuate a single downward extrapolation of the unfiltered wavefield. Moreover, the filtered seismic image creator computer readable program product can include, for example, instructions that, when executed by the computer, cause the computer to perform the operation of creating a filtered seismic image responsive to filtered seismic image data generated by the localized filter computer readable program product at each of the plurality of spatial locations of the unfiltered wavefield.

Such a seismic image filtering machine, according to an exemplary embodiment of the present invention, can further beneficially include a nonstationary convolution operator stabilizer computer readable program product stored in a tangible computer readable storage medium and including instructions that, when executed by the computer, cause the computer to perform the operation of stabilizing each of the nonstationary convolution operators using a weighted least squares with a transition band approach. Additionally, so mineral explorers can better interpret, use, and study the filtered seismic image generated by such a seismic image filtering machine, the seismic image filtering machine can beneficially include, for example, a display and a filtered image displayer computer readable program product stored in a tangible computer readable storage medium and including instructions that, when executed by the computer, cause the computer to perform the operation of displaying the filtered seismic image on the display responsive to converting the filtered seismic image data into a graphic image capable of being displayed on the display in human-readable form.

Moreover, so that both unfiltered and filtered seismic data can be beneficially preserved for any desired future analysis or investigation, the seismic image filtering machine can further include a second database, a third database, and a fourth database, each adapted to be in communication with the computer. The unfiltered wavefield constructor computer readable program product can include instructions, for example, that when executed by the computer, cause the computer to perform the operation of storing the unfiltered wavefield in the second database. Also beneficially, the localized filter computer readable program product can further includes instructions that, when executed by the computer, cause the computer to perform the operation of storing the one or more filtered seismic image data in the third database. Additionally, the filtered seismic image creator computer readable program product can further include, for example, instructions that, when executed to the computer, cause the computer to perform the operation of storing the filtered seismic image in the fourth database.

Another exemplary embodiment of the present invention provides, by way of example, a computer implemented method to generate a filtered seismic data image based on filtered seismic image data by attenuating coherent seismic noise from surface waves through a single downward extrapolation using specially-constructed nonstationary convolution operators to perform localized filtering at each of a plurality of spatial locations of an unfiltered wavefield. According to such an exemplary embodiment of the present invention, the computer implemented method can include, for example, the step of constructing by a computer in a first computer process an unfiltered wavefield delineated by a plurality of spatial locations of unfiltered, unsorted seismic image data based on a plurality of seismic energy signals propagated through a surface wave propagation zone received from a seismic image receiver, as is known and understood by those skilled in the art. Moreover, such a computer implemented method, can also include the step of building, by the computer in a second computer process, a plurality of nonstationary convolution operators, one for each of the plurality of spatial locations of the unfiltered wavefield, responsive to constructing the unfiltered wavefield in the first computer process for each of the plurality of spatial locations of the unfiltered wavefield. Beneficially, each of the nonstationary convolution operators can be based on the coordinate location of each of the plurality of spatial locations of the unfiltered wavefield within the unfiltered wavefield, and the space-variant velocity, temporal frequency, transverse wavenumber, and wavelength of the unfiltered wavefield at each spatial location. To even further increase the efficacy of such nonstationary convolution operators, computer implemented methods, according to various exemplary embodiments of the present invention, can further include the step of stabilizing, in a computer process by the computer, each of the nonstationary convolution operators built for each of the plurality of spatial locations of the unfiltered wavefield using a weighted least squares with a transition band approach.

Responsive to the step of building a plurality of nonstationary convolution operators, such a computer implemented method can also include, for example, the step of extrapolating, by the computer in a third computer process, the unfiltered wavefield at each of the plurality of spatial locations of the unfiltered wavefield to a depth level below the surface wave propagation zone of the seismic energy signals, as is known and understood by those skilled in the art. The step of extrapolating, for example, can beneficially use, at each of the plurality of spatial locations, at least one of the plurality of nonstationary convolution operators built by the computer in the second computer process associated with that one of the plurality of spatial locations, to thereby locally filter each of the plurality of spatial locations of the unfiltered wavefield. Furthermore, a computer implemented method according to an exemplary embodiment of the present invention can include the step of generating, by the computer in a fourth computer process, a filtered seismic image by processing the unfiltered, unsorted seismic image data associated with each of the plurality of spatial locations of the unfiltered wavefield locally filtered by the computer in the third computer process to thereby generate filtered seismic image data that when further processed by the computer generates a filtered seismic image on a display adapted to be in communication with the computer.

Computer implemented methods according to various exemplary embodiments of the present invention can further beneficially include the step of generating filtered seismic image data responsive to extrapolating, by the computer in the third computer process, the unfiltered wavefield at each of the plurality of spatial locations of the unfiltered wavefield. Accordingly, according to an exemplary embodiment of the present invention, the filtered seismic image generated by the computer in the fourth computer process can be beneficially based on such filtered seismic image data. Such computer implemented methods can even further include, for example, the steps of receiving from a seismic image receiver at a recording surface a plurality of seismic energy signals that have propagated throughout a surface wave propagation zone, as is known and understood by those skilled in the art, and converting the plurality of seismic energy signals received from the seismic energy receiver into unfiltered, unsorted seismic image data.

Similarly to various seismic imaging filtering machines according to various exemplary embodiments of the present invention, both filtered seismic image data and unfiltered seismic image data can be stored in databases for future review, investigation, and analysis by subsurface explorers, seismic imaging experts, oil and gas professionals, or other beneficial users. Specifically, a computer implemented method, according to various exemplary embodiments of the present invention can further include the steps of storing the unfiltered, unsorted seismic image data in a first database positioned to be in communication with the computer, storing the unfiltered wavefield constructed by the computer in the first computer process in a second database positioned to be in communication with the computer, storing the filtered seismic image data generated by the computer in the eleventh computer process in a third database positioned to be in communication with the computer, and storing the filtered seismic image generated by the computer in the twelfth computer process in a fourth database positioned to be in communication with the computer. Moreover, to further aid in the analysis of filtered seismic images generated by methods according to exemplary embodiments of the present invention, such methods can further include the step of displaying the filtered seismic image generated by the computer in the twelfth computer process on a display positioned to be in communicated with the computer.

Exemplary embodiments of the present invention also beneficially include a computer implemented method to generate a filtered seismic data image responsive to seismic image data filtered through a single extrapolation by constructing a plurality of nonstationary convolution operators to perform localized filtering at each of a plurality of spatial locations of a two-dimensional, unsorted, unfiltered pressure wavefield delineated by unfiltered seismic image data. Spatial locations within the two-dimensional, unsorted, unfiltered pressure wavefield can be beneficially defined by two coordinates, a first coordinate representing a spatial location within a transverse plane and a second coordinate representing a spatial location within a depth plane. Stated differently, the two-dimensional, unsorted, unfiltered pressure wavefield can be defined as a two-dimensional plane where each point within the plane is defined in terms of its transverse coordinate within the two-dimensional plane and its depth coordinate within the two-dimensional plane. Additionally, according to various exemplary embodiments of the present invention, the depth dimension of the two-dimensional, unsorted, unfiltered pressure wavefield can be bordered at the highest depth by a recording surface plane and at the lowest depth by a plane defining the lowest depth of a surface wave propagation zone, as is known and understood by those skilled in the art. Moreover, the two-dimensional, unsorted, unfiltered pressure wavefield can be bordered in the transverse dimension, for example, by two selected transverse boundaries.

Accordingly, such a computer implemented method according to an embodiment of the present invention can include, for example, the initial steps of receiving from a seismic image receiver at a recording surface a plurality of seismic energy signals that have propagated throughout a two-dimensional surface wave propagation zone, as is known and understood by those skilled in the art, and converting, by a computer the plurality of seismic energy signals received from the seismic energy receiver into unfiltered, unsorted seismic image data, and constructing, by the computer based on the unfiltered, unsorted seismic image data, a two-dimensional, unsorted, unfiltered pressure wavefield including a plurality of spatial locations each defined by a transverse coordinate and a depth coordinate. Once the two-dimensional, unsorted, unfiltered pressure wavefield has been constructed, the computer implemented method can proceed to filter the two-dimensional, unsorted, unfiltered pressure wavefield. Accordingly, such a computer implemented method according to various exemplary embodiments of the present invention can further include the step of locating, by the computer, a selected one of the plurality of spatial locations at a point where the depth level coordinate of the selected one of the plurality of spatial locations is equal to a depth level coordinate of the recording surface and the transverse coordinate of the selected one of the plurality of spatial locations is equal to a transverse coordinate of a first transverse boundary of the two-dimensional surface wave propagation zone, as is known and understood by those skilled in the art.

With a selected starting point now in place, i.e., the selected one of the plurality of spatial locations, such a computer implemented method according to exemplary embodiments of the present invention can proceed to filter the two-dimensional, unsorted, unfiltered pressure wavefield by repeating the following filtering steps for each location within the two-dimensional, unsorted, unfiltered pressure wavefield. The filtering steps included in such a computer implemented method include, for example, the steps of determining by the computer, for the selected one of the plurality of spatial locations within the two-dimensional, unsorted, unfiltered pressure wavefield, a space-variant velocity based on the transverse coordinate of the selected one of the plurality of spatial locations, and determining by the computer responsive to determining the space-variant velocity, for the selected one of the plurality of spatial locations within the two-dimensional, unsorted, unfiltered pressure wavefield, a quotient of a temporal frequency of the selected one of the plurality of spatial locations (indicated or represented by $\omega$) and the space-variant velocity of the selected one of the plurality of spatial locations (indicated or represented by $v(x)$) to thereby define a mathematical function indicated or represented by $k(x)$. Such filtering steps can also include, for example, the step of determining by the computer responsive to determining $k(x)$, for the selected one of the plurality of spatial locations within the two-dimensional, unsorted, unfiltered pressure wavefield, an exponential function of a product of (i) a square root of negative one (indicated or represented by the imaginary number, i), (ii) a preselected wavefield depth increment (indicated or represented by $\Delta z$), and (iii) a square root of (1) a square of a transverse wavenumber (indicated or represented by $k_x$) of the selected one of the plurality of spatial locations subtracted from (2) a square of $k(x)$ ($\sqrt{k(x)^2 - k_x^2}$), to thereby define a multi-variable mathematical function indicated or represented by $\hat{W}(k_x, k(x), \Delta z)$.

Furthermore, the filtering steps included in such a computer implemented method according to an exemplary embodiment of the present invention can further include, for example, the step of determining by the computer responsive to determining $\hat{W}(k_x, k(x), \Delta z)$, for the selected one of the plurality of spatial locations within the two-dimensional, unsorted, unfiltered pressure wavefield, a product of (i) a quotient of one and a product of two and pi (indicated or represented by $\pi$)

$$\left(\frac{1}{2\pi}\right)$$

and (ii) an integral over a set of real numbers (indicated or represented by $\mathfrak{R}$), with respect to the transverse wavenumber of the selected one of the of the plurality of spatial locations ($k_x$), of a product of $\hat{W}(k_x, k(x), \Delta z)$ and an exponential function of: (1) a product of negative square root of negative one (indicated or represented by the imaginary number, i), (2) the transverse wavenumber of the selected one of the plurality of spatial locations ($k_x$), and (3) a difference between the transverse coordinate of the selected one of the plurality of spatial locations (indicated or represented by x') and a transverse coordinate of a second one of the plurality of spatial locations (indicated or represented by x) where the second one of the plurality of spatial locations is located at a point closer to a second transverse boundary of the two-dimensional surface wave propagation zone than the selected one of the plurality of spatial locations $$\left( \frac{1}{2\pi} \int_R \hat{W}(k_x, k(x), \Delta z) e^{-ik_x(x-x')} dk_x \right),$$

to thereby define a multi-variable mathematical function indicated or represented by W(x-x', k(x), $\Delta z$). Once W(x-x', k(x), $\Delta z$) is determined, the computer implemented method can further determine, for example, by the computer responsive to determining W(x-x', k(x), $\Delta z$), a complex conjugate of W(x-x', k(x), $\Delta z$), to thereby define a multi-variable mathematical function indicated or represented by W*(x-x', k(x), $\Delta z$). A complex conjugate, as is known and understood by those skilled in the art, can be defined as one or a pair of complex numbers, each having the same real parts but with imaginary parts that differ in sign. For example, the numbers 2+3i and 2−3i are complex conjugates of each other as is known and understood by those skilled in the art.

Such filtering steps of a computer implemented method according to exemplary embodiments of the present invention can further include the beneficial step of building by the computer responsive to determining W(x-x', k(x), $\Delta z$) and determining W*(x-x', k(x), $\Delta z$), a nonstationary convolution operator for the selected one of the plurality of spatial locations within the two-dimensional, unsorted, unfiltered pressure wavefield by taking an integral over a set of real numbers ($\Re$), with respect to the transverse coordinate of the selected one of the plurality of spatial locations (x'), of a product of W(x-x', k(x), $\Delta z$) and W*(x-x', k(x), $\Delta z$)

$$\left( \int_R W(x-x', k(x), \Delta z) W^*(x-x', k(x), \Delta z) dx' \right),$$

to thereby define a multi-variable mathematical function indicated or represented by P(x-x', k(x), $\Delta z$). Moreover, such filtering steps can further beneficially include, by way of example, the step of extrapolating, by the computer, the two-dimensional, unsorted, unfiltered pressure wavefield at the selected one of the plurality of spatial locations within the two-dimensional, unsorted, unfiltered pressure wavefield using the nonstationary convolution operator for the selected one of the plurality of spatial locations built by the computer by taking an integral over a set of real numbers ($\Re$) of a product of P(x-x', k(x) $\Delta z$) and the two-dimensional, unsorted, unfiltered pressure wavefield (indicated or represented by $\Psi$(x, z+$\Delta z$, $\omega$)

$$\left( \int_R \psi(x', z, \omega) P(x-xi, k(x), \Delta z) dx' \right),$$

to thereby perform localized filtering of the selected one of the plurality of spatial locations (indicated or represented by a multi-variable mathematical function $\psi$(x, z+$\Delta z$, $\omega$)). Each repetition of the aforementioned filtering steps can be, for example, described as a single iteration of the filtering process.

A computer implemented method according to the present invention can further include, for example, the step of generating at each iteration, by the computer, filtered seismic image data responsive to extrapolating, by the computer, the two-dimensional unfiltered pressure wavefield at the selected one of the plurality of spatial locations within the two-dimensional unfiltered pressure wavefield. Additionally, the computer implemented method can beneficially include, for example, the step of generating, by the computer, a filtered seismic image based on the filtered seismic image data generated at each iteration by the computer.

Various other embodiments of the present invention beneficially provide a computer readable program product stored in a tangible computer readable storage medium and including instructions that when executed by a computer cause the computer to perform the operations of constructing an unfiltered wavefield delineated by a plurality of spatial locations from unfiltered, unsorted seismic image data based on a plurality of seismic energy signals propagated through a surface wave propagation zone, as known and understood by those skilled in the art, received from a seismic image receiver, and building, for each of the plurality of spatial locations of an unfiltered wavefield derived from the unfiltered, unsorted seismic image data, a plurality of nonstationary convolution operators, one for each of the plurality of spatial locations of the unfiltered wavefield, each of the nonstationary convolution operators being based on the coordinate location of each of the plurality of spatial locations of the unfiltered wavefield and the space-variant velocity, temporal frequency, transverse wavenumber, and wavelength of the unfiltered wavefield at each spatial location. Such an exemplary computer readable program product can also beneficially include, for example, instructions that when executed by the computer cause the computer to perform the operations of filtering, in a space-frequency domain, each of the plurality of spatial locations of the unfiltered wavefield using, at each of the plurality of spatial locations, at least one of the plurality of nonstationary convolution operators built associated with that one of the plurality of spatial locations and generating a filtered seismic image responsive to each of the plurality of spatial locations of the unfiltered wavefield responsive to filtering, in the space-frequency domain, each of the plurality of spatial locations of the unfiltered wavefield.

Various embodiments of the present invention can provide numerous benefits, including but not limited to the following: (1) accurately filter unfiltered seismic images based on seismic energy signals propagated by a seismic energy source throughout a propagation zone and received by a seismic energy receiver; (2) nonstationary convolution operator filters can be implemented in the seismic energy source domain or the seismic energy receiver domain; (3) provide more computationally efficient filtering processes for unfiltered seismic images; (4) filter a seismic image using only a single downward extrapolation without the need to upward continue the seismic data back to the recording surface domain following filtration; (5) filter seismic energy data without having to first sort such seismic energy data; (6) lower the cost of subsurface mineral deposit exploration by lowering the cost of subsurface seismic imaging; (7) increase the supply of oil into the marketplace by increasing the accuracy and efficiency of subsurface seismic imaging thereby lowering the cost of oil at the pump; and (8) increase the speed of subsurface seismic image filtration so that filtered seismic images can be viewed on a display in real time thereby allowing the such filtered seismic images to be quickly and efficiently analyzed by a subsurface seismic engineer without having to endure a substantial delay due to lengthy, off-site seismic image filtration.

BRIEF DESCRIPTION OF THE DRAWINGS

So that the manner in which the features and benefits of various embodiments of the invention, as well as others which will become apparent, can be understood in more detail, a more particular description of the various embodiments of the invention can be had by reference to the embodiments thereof which are illustrated in the appended drawings, which form a part of this specification. It is also to be noted, however, that the drawings illustrate only various embodiments of the invention and are therefore not to be considered limiting of the invention's scope as it can include other effective embodiments as well.

FIG. 19 is an enlarged view of an unfiltered seismic image, specifically, a seismic stack result, produced using a real dataset acquired from a complex, shallow geological formation according to an embodiment of the present invention.

FIG. 20 is an enlarged view of an filtered seismic image, specifically, a seismic stack result, produced using a real dataset acquired from a complex, shallow geological formation and filtered according to an embodiment of the present invention.

DETAILED DESCRIPTION

Figure 1:
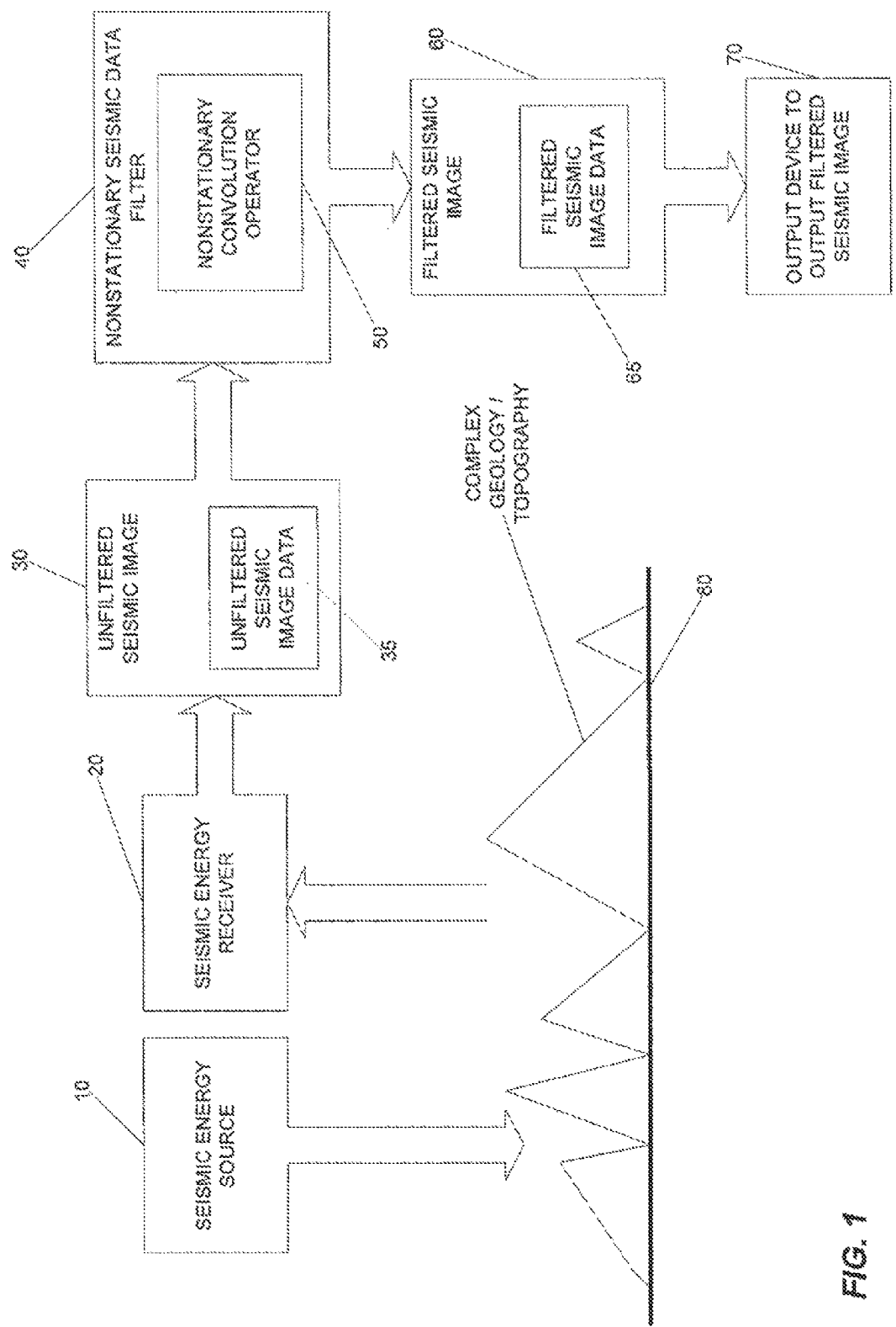
FIG. 1 is high-level schematic block flow diagram of a system to generate a filtered seismic image responsive to seismic image data filtered by attenuating coherent seismic noise from unfiltered seismic image data through a single downward extrapolation of the unfiltered seismic image data using a plurality of nonstationary convolution operators as local filters according to an exemplary embodiment of the present invention.

The present invention will now be described more fully hereinafter with reference to the accompanying drawings which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings. In the drawings and description that follows, like parts are marked throughout the specification and drawings with the same reference numerals, respectively. The prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness.

In the drawings and description that follows, like parts are marked throughout the specification and drawings with the same reference numerals, respectively. The drawings are not necessarily to scale. Certain features of the disclosure can be shown exaggerated in scale or in somewhat schematic form and some details of conventional elements can not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below can be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Embodiments of the present invention advantageously provide, for example, systems, machines, computer readable program products, and associated computer implemented methods to attenuate coherent seismic noise from surface waves using nonstationary filters that require only a single extrapolation process, which can be implemented either in the source or receiver domain, and do not require sorting operations. This approach, for example, can handle strong lateral velocity variations making it an effective tool to remove complicated coherent seismic noise which is typically in the form of exponentially decaying evanescent waves. These embodiments, for example, use specially designed mathematical operators that are implemented in the two-dimensional space-frequency domain as nonstationary filters.

More particularly, embodiments of the present invention advantageously provide, for example, seismic image filtering machines, systems, computer implemented methods, and computer readable program products to generate a filtered seismic image based on seismic image data filtered by attenuating coherent seismic noise from surface waves of an unfiltered wavefield—which is constructed from unfiltered seismic image data gathered from seismic energy detectors, receivers or sensors—using a plurality of nonstationary convolution operators as local filters that require only a single extrapolation process, which can be implemented either in the source or receiver domain, and which do not require any sorting operations. Various embodiments of the invention, for example, can beneficially handle strong lateral velocity variations thus making various embodiments of the present invention effective tools to remove complicated coherent seismic noise which is typically in the form of exponentially decaying evanescent waves. Embodiments of the present invention, for example, use, as a part of the filtering mechanism, specially designed nonstationary convolution operators that are implemented in the space-frequency domain as nonstationary filters. According to various embodiments of the present invention, such nonstationary convolution operators are constructed at each of the plurality of spatial locations of an unsorted wavefield so that each of the plurality of spatial locations of the unsorted wavefield can be locally filtered in a single extrapolation process.

As is perhaps best illustrated by FIG. 1, various embodiments of the present invention can include, by way of example, a system to generate a filtered seismic image responsive to filtered seismic image data produced by attenuating coherent seismic noise from surface waves through a single downward extrapolation of unfiltered seismic image data using a plurality of nonstationary convolution operators as local filters. More particularly, FIG. 1 illustrates a high-level, schematic, block flow diagram overview of such an exemplary system to generate a filtered seismic image responsive to filtered seismic image data produced by attenuating coherent seismic noise from surface waves using nonstationary seismic image data filters. Such a system can include, for example, a seismic energy source 10, a seismic energy receiver 20, an unfiltered seismic image 30 such as, a shot gather or a seismic stack produced by a computer responsive to seismic energy signals received by the seismic energy receiver, a nonstationary seismic image data filter 40 that includes a nonstationary convolution operator 50, a filtered seismic image 60 generated by the computer responsive to seismic energy data filtered by the nonstationary seismic image data filter, and one or more output devices 70. According to various embodiments of the present invention, the seismic energy source 10 can include any seismic or acoustic energy whether from an explosive, implosive, swept-frequency or random sources. The seismic energy source, for example, can generate a seismic energy signal that propagates into the earth 80. As illustrated in FIG. 1, the earth 80 can, for example, take the form of complex geology or topography.

Generally, a seismic energy source 10 can emit seismic waves into the earth 80 to evaluate subsurface conditions and to detect possible concentrations of oil, gas, and other subsurface minerals. Mathematically, seismic waves are waves of force that travel through an elastic body (such as the earth 80) as the result of a natural phenomena (such as an earthquake), a man-made energy (such as an explosion), or some other process that imparts forces into the elastic body (i.e., the earth 80). Seismic energy waves, for example, can occur naturally as the result of the pounding of ocean waves onto the shore. The propagation velocity of seismic waves can depends on the particular elastic medium through which the waves travel, particularly the density and elasticity of the medium as is known and understood by those skilled in the art. For instance, the propagation velocity of seismic waves can range from approximately three to eight (3-8) kilometers per second (km/s) in the earth's 80 crust to up to thirteen (13) kilometers per second (km/s) in the earth's 80 deep mantle. Generally, in the field of geophysics, as is known and understood by those skilled in the art, the refraction or reflection of seismic waves onto a seismic energy receiver 20 can be used to research and investigate subsurface structures of the earth 80.

Accordingly, seismic energy receivers 20 can be positioned to receive and record seismic energy data or seismic field records in any form including, but not limited to, a geophysical time series recording of the acoustic reflection and refraction of waveforms that travel from the seismic energy source 10 to the seismic energy receiver 20. Variations in the travel times of reflection and refraction events in one or more field records in seismic data processing can produce a seismic image 30, defined by unfiltered seismic image data 35, that demonstrates subsurface structure according to an exemplary embodiment of the present invention. Beneficially, such a seismic image 30 can be used to aid in the search for, and exploitation of, subsurface mineral deposits; however, in order for the seismic image to be of the greatest functionality, it must first be filtered.

Generally speaking, seismic image receiver devices 20 can record sound wave echoes (otherwise known as seismic energy signal reflections) that come back up through the ground from a seismic energy source 10 to a recording surface. Such seismic image receiver devices 20 can record the intensity of such sound waves and the time it took for the sound wave to travel from the sound source (or seismic energy source) device 10 back to the seismic energy receiver device 20 at the recording surface. According to various exemplary embodiments of the present invention, for example, during the seismic imaging process, the reflections of sound waves emitted by a seismic energy source device 10, and recorded by a seismic energy recording device 20, can be processed by a computer to generate a three-dimensional digital model, or seismic image, of the subsurface. The three-dimensional model of the subsurface can be used to identify, for example, the placement of wells and potential well flow paths.

More specifically, the term seismic energy receiver 20 as is known and understood by those skilled in the art, can include geophones, hydrophones and other sensors designed to receive and record seismic energy. A geophone, generally speaking, is a seismic energy receiver device 20 which converts ground movement (or displacement of the ground) into voltage which may be recorded at a recording station. A deviation of the measured voltage from a base line measured voltage produces a seismic response which can be analyzed and processed by a computer to produce an unfiltered seismic image of subsurface geophysical structures. Although seismic energy waves propagating through the earth 80 are three-dimensional by nature, geophones are generally constrained to respond to a single dimension—typically the vertical dimension. Thus, geophones are often used in reflection seismology to record seismic energy waves reflected by the subsurface geology. Accordingly, by placing a plurality of geophone seismic energy receivers 20 at a recording surface, a two-dimensional seismic image can be produced responsive to voltage difference data collected by the geophone seismic energy receivers 20. Hydrophones, as are known and understood by those skilled in the art, are another type of seismic energy receiver device 20 designed specifically for underwater recording or listening to underwater sound. Most hydrophones are based on a piezoelectric transducer, as is known and understood by those skilled in the art, that generates electricity when subjected to a pressure change. Piezoelectric transducers can, accordingly, covert a seismic energy signal into an electric signal since seismic energy signals are a pressure wave in fluids.

According to an exemplary embodiment of the present invention, a seismic energy receiver 20 can be positioned to receive and record seismic energy data or seismic field records in any form including a geophysical time series recording of the acoustic reflection and refraction of waveforms that travel from the seismic energy source 10 to the seismic energy receiver 20. Variations in the travel times of reflection and refraction events in one or more field records in a plurality of seismic signals can, when processed by a computer, produce a seismic image 30, defined by unfiltered seismic image data 35, that demonstrates subsurface structure. Such a seismic image 30, however, is unfiltered and accordingly, it may, in many instances, contain not only seismic image data but also complicated coherent seismic noise in the form of evanescent waves as known and understood by those skilled in the art. Such complicated coherent seismic noise with respect to an unfiltered seismic image 30 is similar to fuzz or grain on a image taken with a film camera. By applying certain filters to the film image, it is possible, in many instances, to remove such fuzz or grain. The same is true for complicated coherent seismic noise present in an unfiltered seismic image 30. Accordingly, prior to using a seismic image 30 to aid in the search for, and exploitation of, mineral deposits, the seismic image 30 should first be filtered according to an exemplary embodiment of the present invention.

Although a seismic image 30 can be useful for delineating features in the earth's surface and subsurface, the seismic image 30 often depicts undesired dispersive energy, such as coherent seismic noise, in addition to desired energy. Portions of the unwanted energy can overwhelm, interfere with, or otherwise mask portions of the seismic image useful for delineating features in the earth's surface. Particularly, when propagating through an irregular near surface, such as rugged topography or complex geology 80, seismic energy signals can have complicated wave paths and lateral velocity variations thereby resulting in unwanted dispersive energy. Much of this energy propagates horizontally in the near surface. In the presence of complex geology and rugged topography, the energy can have a complicated wave path, thus making its removal a challenging task. Nevertheless, removing this dispersive energy is an important step to focus the seismic image 30 so that, for example, the image is useful for extracting seismic attributes, for analyzing seismic waveform velocity, and for wavelet processing.

More particularly, as is known and understood by those skilled in the art, there are two types of seismic waves, surface waves and body waves. Generally speaking, body waves travel through the interior of the Earth while surface waves travel just under the Earth's surface. Surface waves, as is known and understood by those skilled in the art, can be compared analogously to water waves and travel more slowly than body waves. In the field of physics, a surface wave is typically described by those skilled in the art as a type of mechanical wave that propagates along the interface between differing media, such as two fluids with different densities, or the earth's 80 crust and the earth's more dense upper mantle. Due to the complex and often rugged topography of the earth's 80 surface, surface waves can often have complicated wave paths when propagating through the earth's 80 surface. Such surface waves, when received and recorded by a seismic energy receiver 20 can result in coherent seismic noise that can make reading and analyzing a seismic image of subsurface structures difficult.

According to an exemplary embodiment of the present invention, a nonstationary seismic image data filter 40 can be implemented in the space-frequency domain and can include a nonstationary convolution operator 50 designed using a weighted least squares with a transition band approach, as is known and understood by those skilled in the art. Conceptionally, convolution, as is known and understood by those skilled in the art, can be described as the process of replacing each point of data of an unfiltered image by a scaled copy of a convolution filter or operator. Commonly, convolution operators (or filters), as is known and understood in the art, are stationary, meaning that the operator's form does not change with space or time. While such stationary convolution operators accurately filter more traditional images, a stationary convolution operator's inability to change its form with space or time (i.e., velocity) is often too limiting to accurately filter geophysical seismic images.

According to various exemplary embodiments of the present invention, unfiltered seismic image data 35 can be used to construct, by a computer, an unfiltered wavefield including a plurality of wavelets and delineated by a plurality of spatial locations as is known and understood by those skilled in the art. The velocity of various spatial locations within such an unfiltered wavefield can vary from spatial location to spatial location and as such, stationary convolution operators are unable to provide the needed flexibility. A mathematical process which can form a scaled superposition of a filter while allowing the wavelet radius to depend on a local velocity at a spatial location of within a wavefield is known and understood by those skilled in the art as a nonstationary convolution. Beneficially, and unlike stationary convolution operators, nonstationary convolution operators 50, according to various exemplary embodiments of the present invention, can change form, for example, in a controlled fashion with time and space. That is, nonstationary convolution operators 50 can beneficially be, for example, dependent on velocity measurements at various spatial locations of an unfiltered wavefield formed from unfiltered seismic image 30 defined by a plurality of unfiltered seismic image data 35 according to various exemplary embodiments of the present invention. Thus, such nonstationary convolution operators can, for example, be used to filter an unfiltered seismic image 30 to thereby generate a filtered seismic image 60.

Such a nonstationary seismic image data filter 40, according to an exemplary embodiment of the present invention, can be configured, for example, to attenuate coherent seismic energy, or noise, from the seismic image 30. The nonstationary seismic image data, according to an exemplary embodiment of the present invention, can apply a nonstationary convolution operator to downwardly continue the plurality of unfiltered seismic image data 35 that defines the seismic image 30 to a depth level below the surface wave propagation zone to thereby generate new filtered seismic image data 65 that define a filtered seismic image 60.

Figure 2:
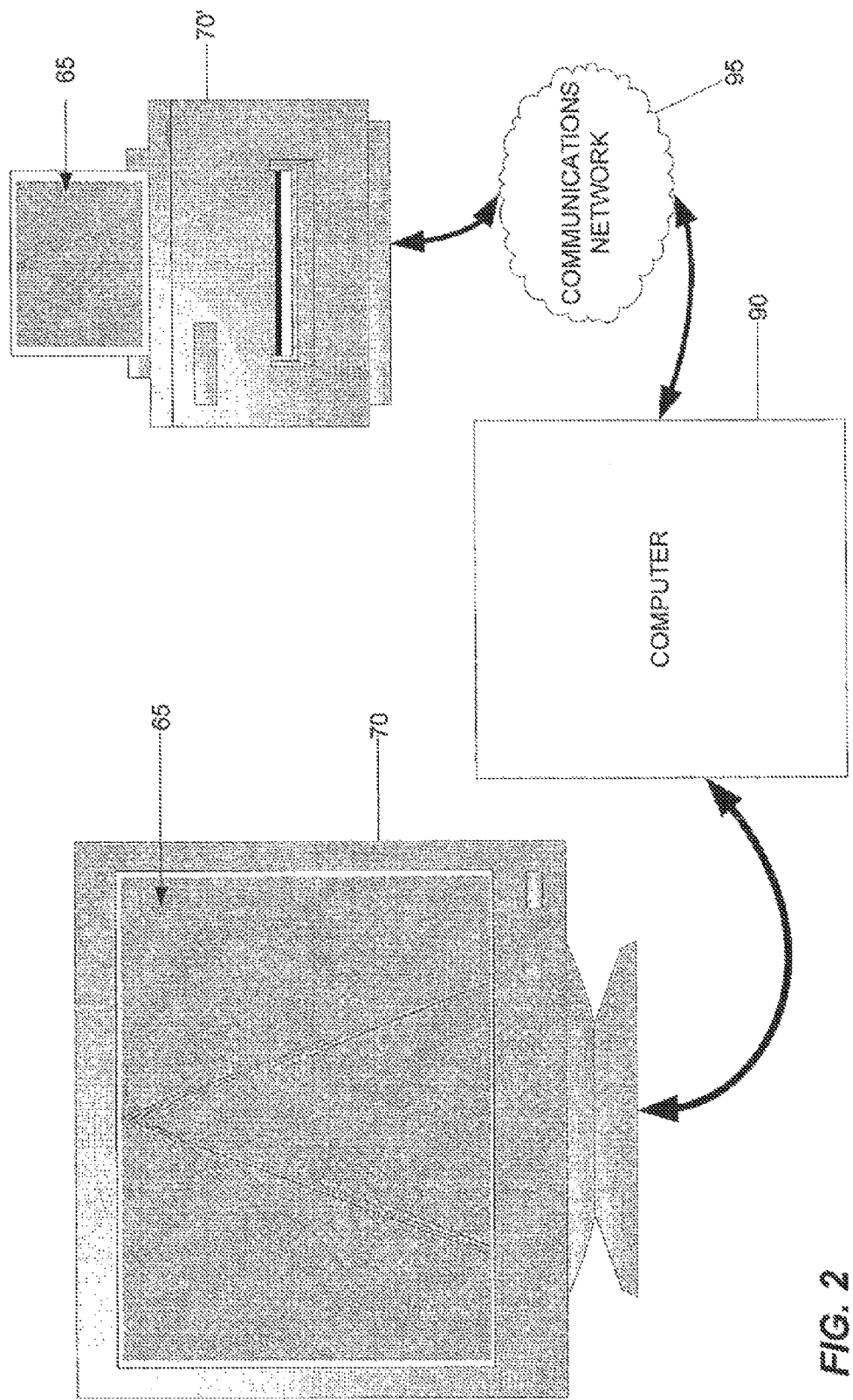
FIG. 2 is a schematic block diagram of a filtered seismic image created and produced on one or more output devices adapted to be in communication with a computer responsive to filtered seismic image data generated by attenuating coherent seismic noise from surface waves of an unfiltered wavefield constructed from the seismic image data using a plurality of nonstationary convolution operators according to an exemplary embodiment of the present invention.

Beneficially, and as described in greater detail herein, the nonstationary seismic image data filter 40 can filter the unfiltered seismic image 30, for example, through only a single downward extrapolation process and without the need to sort the unfiltered seismic image data 35. When compared to other filter configurations which require multiple data extrapolation processes and a sorted data set, the embodied filter enhances the speed and efficiency of current seismic filters by reducing the process steps necessary to filter a seismic image. Generally, images of various types, including both filtered 60 and unfiltered 30 seismic images, can be represented by a plurality of image data points typically in the form of an image matrix as is known and understood by those skilled in the art. As is perhaps best illustrated in FIG. 2, such an image matrix can be processed and manipulated by a computer in order to produce a human-readable version of the image represented by the plurality of image data points on one or more output devices 70 adapted to be in communication with the computer 90.

The one or more output devices adapted to be in communication with the computer 90 can be in communication with the computer through a communications network 95 as is known and understood by those skilled in the art. The communications network 95 can include, for example, a local area network, a wide area network, a telephony network, a wireline network, a wireless network, a wide area network, an infrared network, a radio-frequency network, an optical network, or any other communications network now or hereinafter created as is known and understood by those skilled in the art. Seismic energy source devices 10 and seismic energy receiver devices 20 can, according to exemplary embodiments of the present invention, be adapted to be in communication with a computer 90 via a communications network 95. Furthermore, seismic energy source devices 10 and seismic energy receiver devices 20 can alternatively be positioned, for example, to be in communication with a computer 90 without the need for a communications network 95. Seismic image data can include, for example, a plurality of image data points, as is known and understood by those skilled in the art. Furthermore, the plurality of seismic image data points can be in the form of an array, a linked-list, a matrix, a queue, a stack, a tree, a binary tree, a b-tree, a hash table, a heap, a binomial heap, a set, a disjoint set, or any other data structure now or hereinafter developed as is known or understood by those skilled in the art.

Accordingly, various exemplary embodiments of the present invention can beneficially produce, for example, a filtered seismic image 65 on an output device 70 adapted to be in communication with a computer 90 responsive to seismic image data filtered by attenuating coherent seismic noise from an unfiltered seismic image data using a plurality of nonstationary convolution operators as local filters. Filtered seismic image data, according to various embodiments of the present invention, for example, can be converted, by a computer 90, from a matrix of data points 60 (as further described above) into a graphic image (or other graphic image form) 65 capable of being displayed on a display 70, printed to a printer 70', or otherwise produced via an output device. An output device 70 can include, for example, a printer, a brail printer, a television, a monitor, a CRT monitor, an LCD monitor, a plasma monitor, an OLED screen, a DLP monitor, a video projection, a three-dimensional projection, a touch screen, and any other piece of electronic hardware equipment used to communicate the results of data processing carried out by any information processing system (such as a computer) now or hereinafter developed as is known or understood by those skilled in the art. Moreover, as used throughout, the term display can include, for example, a CRT monitor, a LCD monitor, a plasma monitor, a OLED screen, a television, a DLP monitor, a video projection, a three-dimensional projection, a touch screen, and any other graphical user interface device currently or hereinafter developed as is known and understood by those skilled in the art.

Consider, for instance, that a typical sorting routine can require operations on the order of n-squared, where n is the number of data points to be sorted. For example, up to ten-thousand (10,000) process steps could be required to sort seismic image data containing one-hundred (100) seismic image data points. A nonstationary seismic image filter according to various embodiments of the present invention therefore can improve the speed and efficiency of the rate at which seismic images are filtered by eliminating the onerous requirement of sorted data. Additionally, the embodied filter enhances the speed and efficiency of the filtering process by using only a single downward extrapolation process where current filters require both a downward extrapolation of the unfiltered seismic energy data throughout a defined propagation zone of the seismic energy surface wave signals followed by an upward continuation of the unfiltered seismic energy data back up to a recording surface of the seismic energy signals.

Beneficially, for example, the nonstationary seismic image data filter 60 can handle strong lateral velocity variation thereby making it an effective tool to remove complicated coherent noise due to complex geology or rugged topography 80. Generally, the nonstationary seismic image data filter 60 can be beneficially derived from the space-frequency explicit wavefield extrapolation imaging algorithm so that nonstationary seismic image data filters 60 according to various embodiments of the present invention can be beneficially implemented in legacy systems and with legacy software. At each lateral spatial location, the velocity information of the seismic energy signal can be used to build nonstationary convolution operators which perform localized filtering in the space-frequency domain. Furthermore, the configuration of the nonstationary convolution operators according to exemplary embodiments of the present invention can, for example, use the same velocity model used for resolving near surface distortions.

Figure 3:
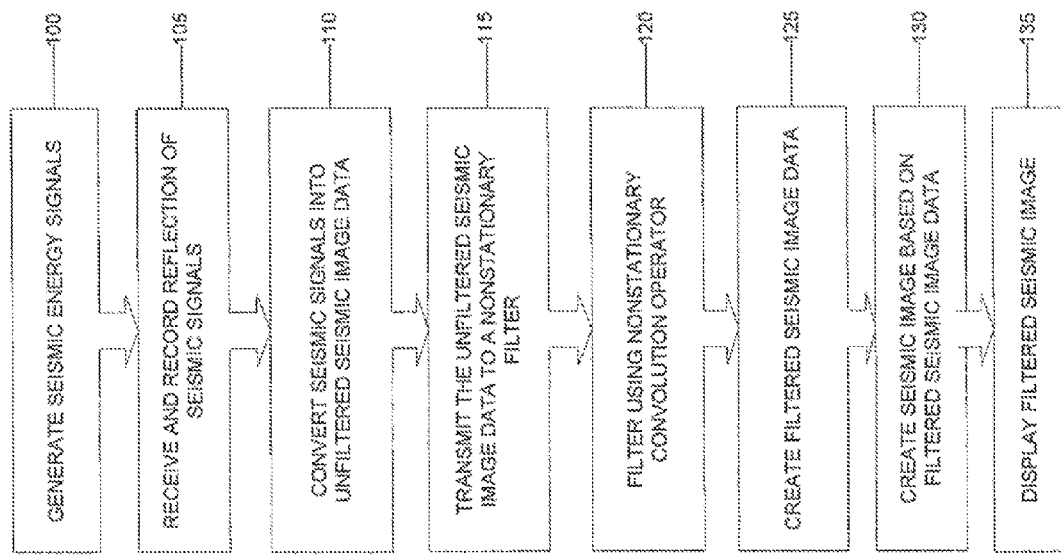
FIG. 3 is a high-level schematic block flow diagram of a computer implemented method to generate a filtered seismic image through a single downward extrapolation using a plurality of nonstationary convolution operators as local filters according to an exemplary embodiment of the present invention.

FIGS. 3 through 8 illustrate, by way of example, various exemplary computer implemented methods according to embodiments of the present invention to generate a filtered seismic data image responsive to seismic image data filtered by attenuating coherent seismic noise from surface waves of an unfiltered wavefield constructed from unfiltered seismic image data through a single downward extrapolation using specially-constructed nonstationary convolution operators to perform localized filtering at each of a plurality of spatial locations of an unfiltered wavefield defined by the unfiltered seismic image data. FIG. 3 perhaps best illustrates a simplified form of such various computer implemented methods to generate a filtered seismic data image responsive to seismic image data filtered according to various exemplary embodiments of the present invention. For example, such computer implemented methods can include the steps of generating a plurality of seismic energy signals using a seismic energy source that propagates into the earth and is at least partially reflected by subsurface seismic reflectors as is known and understood in the art (block 100), receiving and recording a plurality of reflections and refractions of the plurality of seismic energy signals using a seismic image receiver or sensor as is known and understood by those skilled in the art (block 105), and converting the plurality of reflections and refractions of the plurality of seismic energy signals into unfiltered, unsorted seismic image data as is known and understood by those skilled in the art (block 110). The subsurface seismic reflectors that at least partially reflect the plurality of seismic energy signals can include, for example, interfaces between underground formations having different acoustic impedances. The plurality of reflections and refractions of the plurality of seismic energy signals can be recorded (block 105), for example, in one or more geophysical time series by seismic energy receivers or sensors located at or near the surface of the earth, in a body of water, or at known depths in boreholes.

Once unfiltered, unsorted seismic image data is obtained from seismic energy receivers, such computer implemented methods according to various embodiments of the present invention can further include various steps to filter the unfiltered, unsorted seismic image data to thereby beneficially generate a filtered seismic image. In particular, a computer implemented method according to an exemplary embodiment of the present invention can further include the steps of transmitting unfiltered seismic image data to a nonstationary seismic image data filtered (block 115), and filtering the unfiltered seismic image data (block 120) to thereby generate filtered seismic image data (block 125) by applying a nonstationary convolution operator to downwardly continue the seismic data to a depth level below a propagation zone of the plurality of the seismic energy signals. The nonstationary seismic image data filter can, for example, be implemented in the space-frequency domain, and the nonstationary convolution operator can, for example, be designed using a weighted least-squares with a transition band approach. Furthermore, according to an embodiment of the present invention, the propagation zone of the plurality of seismic energy signals, as is known and understood by those skilled in the art, can be defined to be the area bounded at the top and at the bottom by the highest and lowest elevations, respectively, at which the plurality of seismic energy signals first propagate into the earth.

Furthermore, according to an exemplary embodiment of the present invention, such a computer implemented method can further include the steps of generating a filtered seismic image (block 130) based on the filtered seismic image data generated responsive to the step of filtering the unfiltered seismic image data (block 120), and displaying the filtered seismic on a display. Additionally, according to an exemplary embodiment of the present invention, the step of filtering unfiltered seismic image data (block 120) to thereby beneficially generate filtered seismic image data (block 125) by applying a nonstationary convolution operator to downwardly continue the unfiltered seismic data to a depth level below a propagation zone of a plurality of surface waves produced by the plurality of the seismic energy signals can further include the step of receiving as input, a temporal frequency based on the unfiltered seismic image data as is known and understood by those skilled in the art, a transverse wavenumber based on the plurality of unfiltered seismic image data as is known and understood by those skilled in the art, a space-variant velocity field based on the plurality of unfiltered seismic image data as is known and understood by those skilled in the art, the unfiltered seismic image data, a measurement of the depth of a two-dimensional wavefield represented by the unfiltered seismic image data as is known and understood by those skilled in the art, a depth iteration increment as is known and understood by those skilled in the art, a transverse coordinate of the two-dimensional wavefield at input as is known and understood by those skilled in the art, and a transverse coordinate of the two-dimensional wavefield at output as is known and understood by those skilled in the art.

Figure 4:
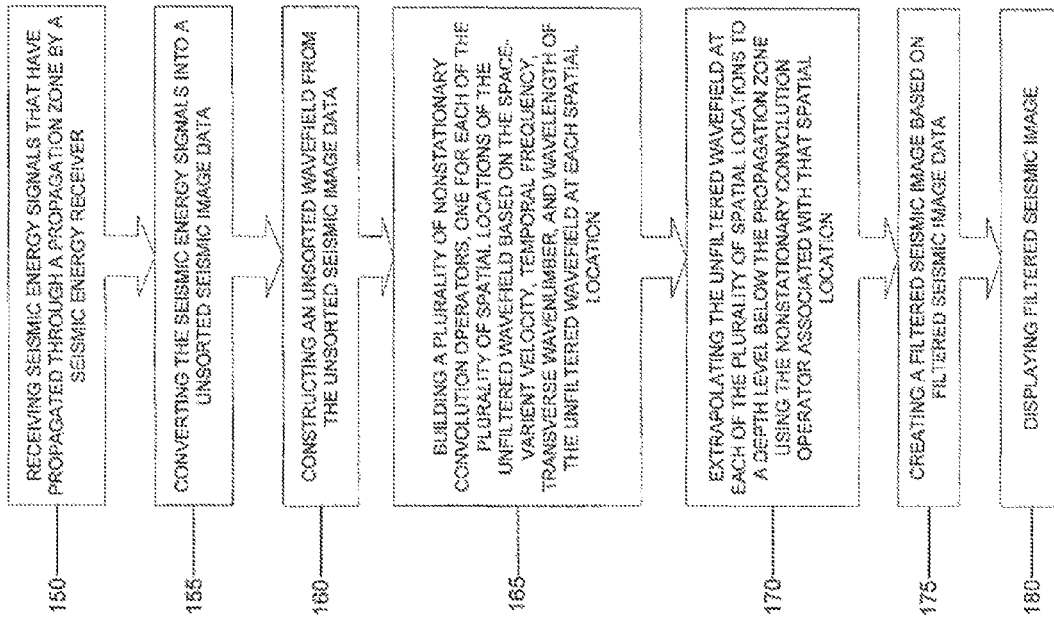
FIG. 4 is a high-level schematic block flow diagram of a computer implemented method to generate a filtered seismic image through a single extrapolation by constructing a plurality of nonstationary convolution operators to perform localized filtering according to an exemplary embodiment of the present invention.

As is perhaps best illustrated by FIG. 4, other various embodiments of the present invention can provide a computer implemented method to generate a filtered seismic data image based on filtered seismic image data generated by attenuating coherent seismic noise from surface waves of an unfiltered wavefield, constructed from unfiltered seismic image data, through a single downward extrapolation using specially-constructed nonstationary convolution operators to perform localized filtering at each of a plurality of spatial locations of the unfiltered wavefield. Such an exemplary computer implemented method can include, for example, the steps of receiving from a seismic image receiver, at a recording surface, a plurality of seismic energy signals that have propagated throughout a surface wave propagation zone (block 150), converting the plurality of seismic energy signals received from the seismic energy receiver into unfiltered, unsorted seismic image data (block 155), and constructing an unfiltered wavefield delineated by a plurality of spatial locations from the unfiltered, unsorted seismic image data based on the plurality of seismic energy signals that have propagated through the surface wave propagation zone and have been received and recorded by a seismic image receiver (block 160). Furthermore, such a computer implemented method according to various exemplary embodiments of the present invention can further include the step of building a plurality of nonstationary convolution operators, one for each of the plurality of spatial locations of the unfiltered wavefield, responsive to constructing the unfiltered wavefield for each of the plurality of spatial locations of the unfiltered wavefield (block 165), and extrapolating, responsive to building each of the plurality of nonstationary convolution operators, the unfiltered wavefield at each of the plurality of spatial locations of the unfiltered wavefield to a depth level below the surface wave propagation zone of the seismic energy signals using, at each of the plurality of spatial locations, at least one of the plurality of nonstationary convolution operators built by the computer associated with that one of the plurality of spatial locations, to thereby locally filter each of the plurality of spatial locations of the unfiltered wavefield (block 170).

Each of the nonstationary convolution operators, for example, can beneficially be based on the coordinate location of each of the plurality of spatial locations of the unfiltered wavefield within the unfiltered wavefield as is known and understood by those skilled in the art, and a space-variant velocity, temporal frequency, transverse wavenumber, and wavelength of the unfiltered wavefield at each spatial location as are known and understood by those skilled in the art. Beneficially, such computer implemented methods according to various exemplary embodiments of the present invention can further include the step of stabilizing each of the nonstationary convolution operators built by the computer for each of the plurality of spatial locations of the unfiltered wavefield (block 165) using a weighted least squares with a transition band approach as is known and understood by those skilled in the art and as is explained in greater detail herein. Furthermore, exemplary computer implemented methods according to various embodiments of the present invention can further include the steps of generating a filtered seismic image responsive to each of the plurality of spatial locations of the unfiltered wavefield locally filtered by the computer (block 175), and displaying the filtered seismic image generated by the computer on a display positioned to be in communicated with the computer (block 180).

According to exemplary embodiments of the present invention, each of the plurality of nonstationary convolution operators can be different from each of the others of the plurality of nonstationary convolution operators, and each of the plurality of nonstationary convolution operators can, for example, be uniquely associated with one of the plurality of spatial locations of the unfiltered wavefield so that particularized localized filtering can be beneficially performed at each of the plurality of spatial locations of the unfiltered wavefield. Moreover, each of the plurality of nonstationary convolution operators, one for each of the plurality of spatial locations of the unfiltered wavefield, can be built, by way of example, by performing an inverse Fourier transformation over the transverse wavenumber coordinate of a power of a phase shift operator at each of the plurality of spatial locations of the unfiltered wavefield. Additionally, the step of extrapolating responsive to building each of the plurality of nonstationary convolution operators (block 170) can be implemented, for example, in one of, of both, the seismic energy source domain or the seismic energy receiver domain.

Also according to an exemplary embodiment of the present invention, the step of extrapolating the unfiltered wavefield at each of the plurality of spatial locations of the unfiltered wavefield to a depth level below the surface wave propagation zone of the seismic energy signals to thereby locally filter each of the plurality of spatial locations of the unfiltered wavefield (block 170) can further include the step of taking an integral over a set of real numbers of a product of a nonstationary convolution operator built according to an exemplary embodiment of the present invention (indicated or represented by P(x-x', k(x), $\Delta$z)) and the unfiltered wavefield to thereby perform localized filtering of the selected one of the plurality of spatial locations. Furthermore, the step of constructing the unfiltered pressure wavefield (block 160) can further include the step of constructing the unfiltered pressure wavefield further includes the step of performing a Fourier transformation of the unfiltered wavefield over a temporal coordinate. Such exemplary computer implemented methods according to various embodiments of the present invention can also include the step of generating filtered seismic image data for each of the plurality of spatial locations of the unfiltered wavefield responsive to extrapolating the unfiltered wavefield at each of the plurality of spatial locations of the unfiltered wavefield, and the filtered seismic image generated by the computer in the fourth computer process can be based, for example, on the filtered seismic image data.

Moreover, a computer implemented method according to exemplary embodiments of the present invention can further include the beneficial steps of storing the unfiltered, unsorted seismic image data in a first database positioned to be in communication with the computer, storing the unfiltered wavefield constructed by the computer in the first computer process in a second database positioned to be in communication with the computer, storing the filtered seismic image data generated by the computer in the eleventh computer process in a third database positioned to be in communication with the computer, and storing the filtered seismic image generated by the computer in the twelfth computer process in a fourth database positioned to be in communication with the computer.

Figure 5:
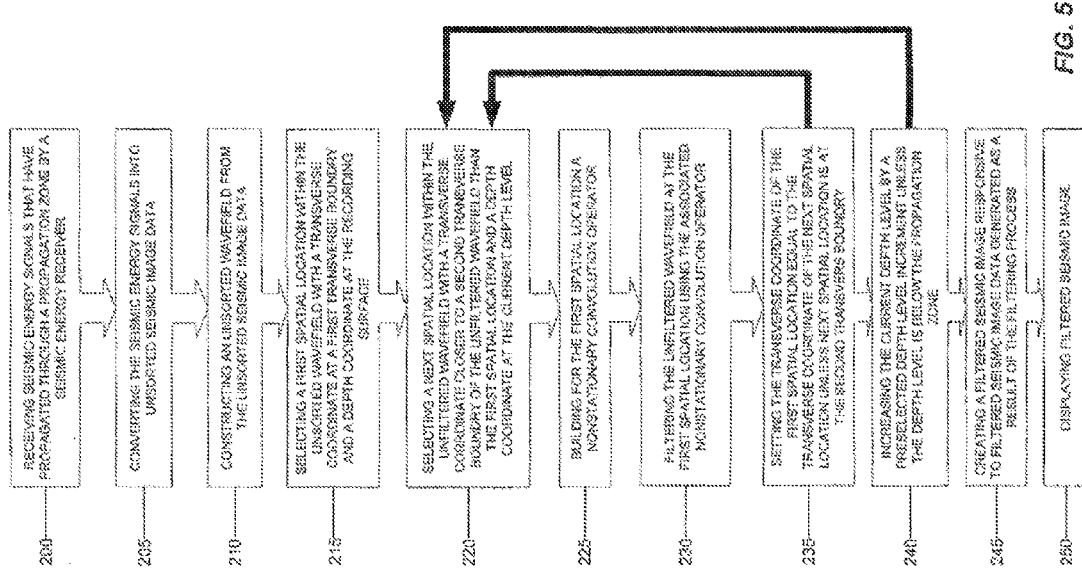
FIG. 5 is a low-level, detailed schematic block flow diagram of a computer implemented method to generate a filtered seismic data image through a single downward extrapolation by constructing a plurality of nonstationary convolution operators to perform localized filtering at each of a plurality a spatial locations of a two-dimensional, unsorted, unfiltered pressure wavefield according to an exemplary embodiment of the present invention.

As is perhaps best illustrated by FIG. 5, various embodiments of the present invention can also provide a computer implemented method to filter unfiltered, unsorted seismic image data through a single extrapolation of the unfiltered, unsorted seismic image data by constructing a plurality of nonstationary convolution operators to perform localized filtering at each of a plurality of spatial locations of a two-dimensional, unsorted, unfiltered pressure wavefield constructed from the unfiltered, unsorted seismic image data. Such a computer implemented method can include, for example, the steps of receiving from a seismic image receiver at a recording surface a plurality of seismic energy signals that have propagated throughout a surface wave propagation zone (block 200), converting the plurality of seismic energy signals received from the seismic energy receiver into unfiltered, unsorted seismic image data (block 205), constructing, based on the unfiltered, unsorted seismic image data, an unfiltered wavefield including a plurality of spatial locations each defined by a transverse coordinate and a depth coordinate (block 210), and selecting as a first spatial location within the unfiltered wavefield a location with a transverse coordinate at a first transverse boundary of the unfiltered wavefield and a depth coordinate of the location of the recording surface (block 215). The unfiltered wavefield, according to an embodiment of the present invention, can be, for example, a two-dimensional, unsorted, unfiltered pressure wavefield.

A computer implemented method according to various embodiments of the present invention can also include the step of selecting as a next spatial location within the unfiltered wavefield a location with a transverse coordinate closer to a second transverse boundary of the unfiltered wavefield than the first spatial location and a depth coordinate at a current depth level (block 220). With the two reference locations (i.e., the first spatial location and the next spatial location) selected, the computer implemented method according to an exemplary embodiment of the present invention can further include the steps of building, for the first spatial location, a nonstationary convolution operator based on the coordinate location of the first spatial location of the unfiltered wavefield and the space-variant velocity, temporal frequency, transverse wavenumber, and wavelength of the unfiltered wavefield at the first spatial location (block 225). Following the step of building the nonstationary convolution operator (block 225), such a computer implemented method can further include the step of filtering, in a space-frequency domain, the first spatial locations of the unfiltered wavefield using the nonstationary convolution operator built for the first spatial location (block 230). Beneficially, such a computer implemented method can then further include the step of setting the transverse coordinate of the first spatial location equal to the transverse coordinate of the next spatial location and repeating the steps outlined in blocks 220 to 235 until the next special location is located at, or outside of, the second transverse boundary. Such a computer implemented method can subsequently include the step of increasing the current depth level by a preselected depth level increment and repeating the steps outlined in blocks 220 to 240 until the current depth level is at, or below, the surface wave propagation zone. After completing the recursive process outlined above, a computer implemented method according to an exemplary embodiment of the present invention can further include the steps of generating a filtered seismic image based on filtered seismic image data generated responsive to each of the plurality of spatial locations of the unfiltered wavefield filtered in the space-frequency domain (block 245), and lastly, displaying the filtered seismic image on a display device adapted to be in communication with the computer (block 250).

Figure 6:
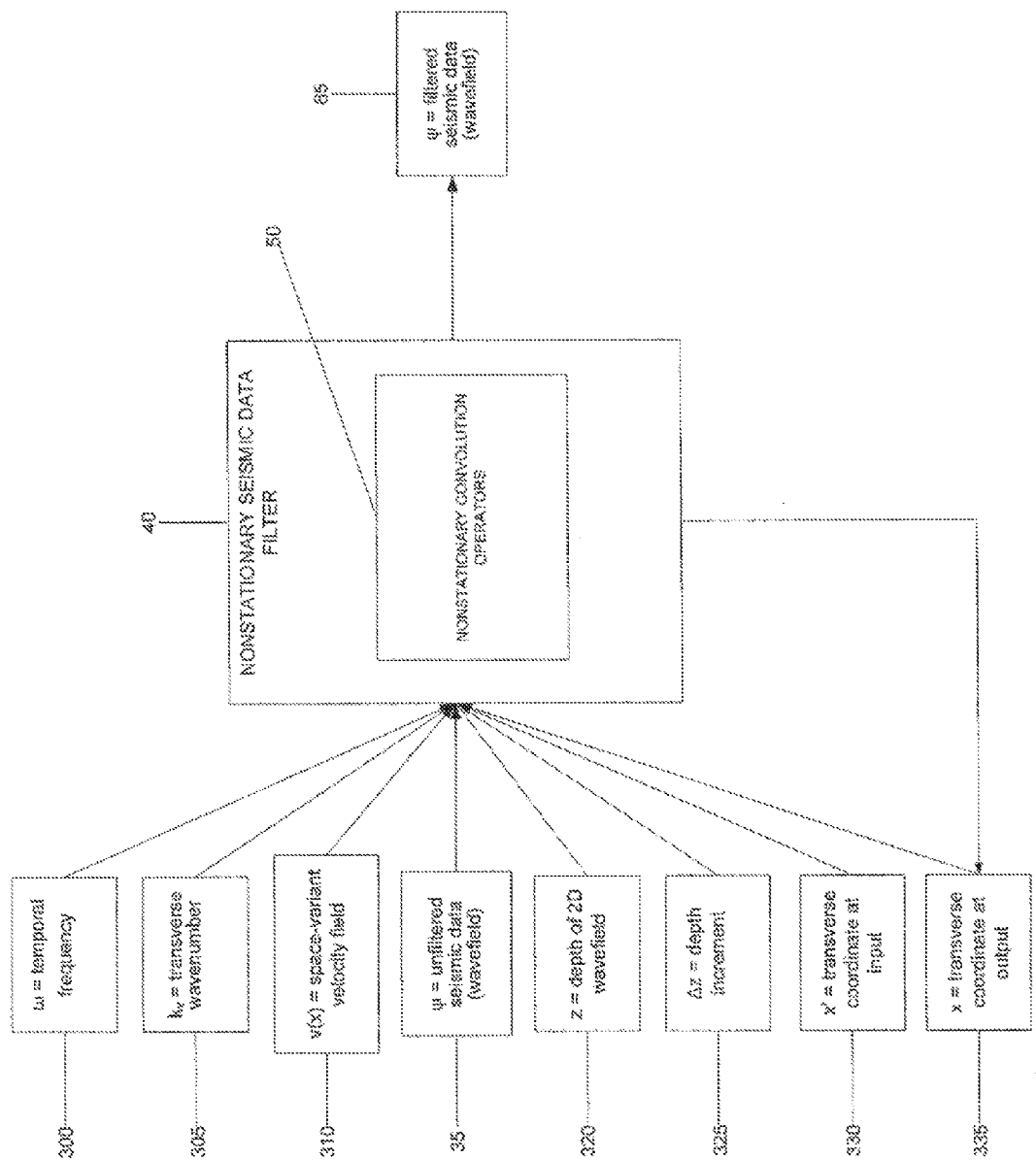
FIG. 6 is a high-level schematic block flow diagram illustrating the mathematical inputs used by a nonstationary seismic data filter and the output of such a nonstationary seismic data filter according to an exemplary embodiment of the present invention.

As is perhaps best illustrated in FIG. 6, a nonstationary seismic image data filter 40 according to various exemplary embodiments of the present invention can receive, for example, as input at each iteration of the process outlined above unfiltered seismic image data (indicated or represented by $\psi$) 35, a temporal frequency of an unfiltered wavefield (indicated or represented by $\omega$) constructed from the unfiltered seismic image data at a selected spatial location within the unfiltered wavefield as is known and understood by those skilled in the art 300, a transverse wavenumber (indicated or represented by $k_x$) of the unfiltered wavefield at the selected spatial location within the unfiltered wavefield as is known and understood by those skilled in the art 305, a space-variant velocity field (indicated or represented by v(x)) of the unfiltered wavefield at the selected spatial location with the unfiltered wavefield as is known and understood by those skilled in the art 310, a measurement of the depth of the unfiltered wavefield (indicated or represented by z) as is known and understood by those skilled in the art 320, a preselected depth iteration increment (indicated or represented by $\Delta z$) as is known and understood by those skilled in the art 325, a transverse coordinate at input (indicated or represented by x') representing the transverse coordinate of the spatial location within the unfiltered wavefield currently being filtered 330, and a transverse coordinate at output (indicated or represented by x) representing the transverse coordinate of a next spatial location within the unfiltered wavefield to be filtered 335. Furthermore, the nonstationary seismic image data filter can provide, for example, as output, filtered seismic image data (indicated or represented by $\psi$) 65 and a transverse coordinate at output (indicated or represented by x) representing the transverse coordinate of the next spatial location within the unfiltered wavefield to be filtered by the nonstationary seismic image data filter 65.

According to an exemplary embodiment of the present invention, the nonstationary convolution operator 50 can be implemented as a function of multiple variables, the output of which can be, for example, seismic image data resulting from the linear combination of output of a convolution operator and output of the complex conjugate of the same convolution operator. Generally, convolution is a mathematical operation that provides a way of multiplying together two arrays (or matrices) of numbers, generally of different sizes but of the same dimensionality, to produce a third array (or matrix) of numbers of the same dimensionality. This can be used in image processing to implant operators whose output pixel values are simple linear combinations of certain input pixel values.

Figure 7:
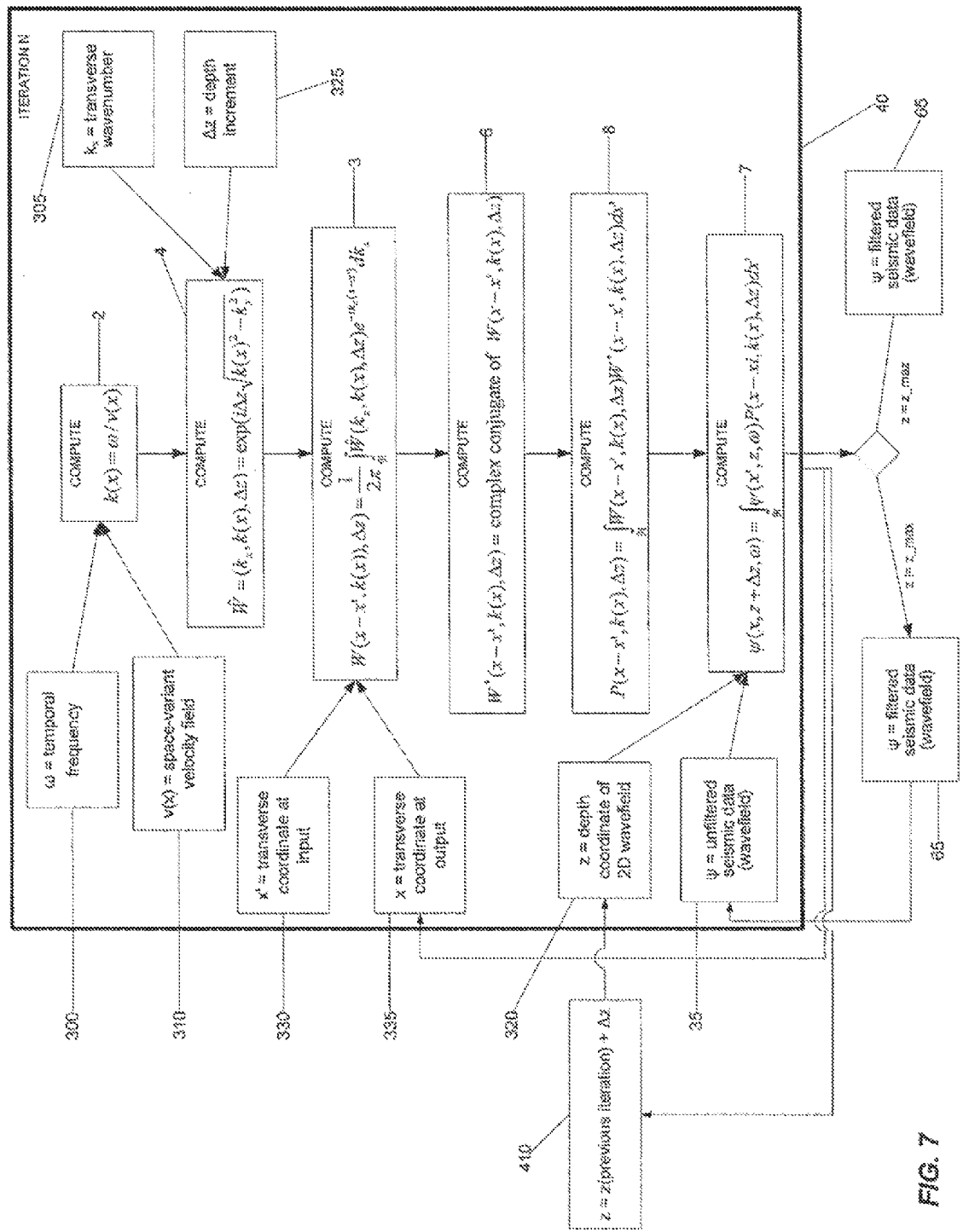
FIG. 7 is a low-level, detailed schematic block mathematical flow diagram illustrating various mathematical calculations and manipulations of unfiltered seismic image data recursively performed by a nonstationary seismic data filter in order to generate a filtered seismic data image through a single downward extrapolation of unfiltered seismic image data according to an exemplary embodiment of the present invention.

More specifically, according to an embodiment of the present invention, as is perhaps best illustrated in FIG. 7, the 2D space-frequency explicit wavefield extrapolation algorithm, for example, can be used to extrapolate an unfiltered wavefield to a depth level below the propagation zone of the coherent seismic noise according to a multi-variable mathematical function indicated or represented by $$\psi(x, z + \Delta z, \omega) = \int_{\mathbb{R}} \psi(x', z, \omega) W(x - x', k(x), \Delta z) dx', \quad \text{(equation 1)}$$

where the mathematical symbol $\mathbb{R}$ refers to real numbers and $k(x) = \omega/v(x)$ (equation 2). Here, the mathematical symbol $\psi$ can represent, for example, a two-dimensional, unsorted, unfiltered pressure wavefield 35 after a Fourier transformation of the two-dimensional, unsorted, unfiltered pressure wavefield 35 has been performed over the temporal coordinate. Furthermore, according to exemplary embodiments of the present invention, the mathematical symbol z can indicate or represent the depth of such a two-dimensional, unsorted, unfiltered pressure wavefield as is known and understood by those skilled in the art 320, the mathematical symbol $\Delta z$ can indicate or represent a preselected depth increment as is known and understood by those skilled in the art 325, the mathematical symbol $\omega$ can indicate or represent the temporal frequency of the two-dimensional, unsorted, unfiltered pressure wavefield at a particular spatial location within the wavefield as is known and understood by those skilled in the art 300, the mathematical symbol $k_x$ can indicate or represent the transverse wavenumber of the two-dimensional, unsorted, unfiltered pressure wavefield at a particular spatial location within the wavefield as is known and understood by those skilled in the art 305, the mathematical symbol x' can indicate or represent the transverse coordinate of a spatial location within the two-dimensional, unsorted, unfiltered pressure wavefield at input as is known and understood by those skilled in the art 330, the mathematical symbol x can indicate or represent the transverse coordinate the transverse coordinate of a spatial location within the two-dimensional, unsorted, unfiltered pressure wavefield at output as is known and understood by those skilled in the art 335, and the mathematical function $v(x)$ can represent the space-variant velocity field of the unfiltered wavefield at a spatial location with the unsorted wavefield as is known and understood by those skilled in the art 310.

Accordingly, the kernel of equation (1) can be defined mathematically as a multi-variable function, for example, as:

$$W(x - x', k(x)), \Delta z) = \frac{1}{2\pi} \int_{\mathbb{R}} \hat{W}(k_x, k(x), \Delta z) e^{-ik_x(x - x')} dk_x \quad \text{(equation 3)}$$

where (equation 4)

$$\hat{W}(k_x, k(x), \Delta z) = \exp\left(i\Delta z \sqrt{k(x)^2 - k_x^2}\right).$$

When the velocity is constant, equation 1 beneficially becomes the space-frequency equivalent of Gazdag's (1978) phase-shift extrapolation. The nonstationary convolution operator, W, can beneficially handle, for example, lateral velocity variations by using a different operator for each spatial lateral location.

As is known and understood by those skilled in the art, the region where $|k_x| \le |k|$ is called the propagating waves region, and the region where $|k_x| > |k|$ is called the evanescent waves region. Evanescent waves are exponentially decaying with depth, and unwanted coherent seismic noise, such as, ground roll energy or other unwanted energy attributable to surface waves, falls in this region. Accordingly, the unwanted coherent seismic noise can be filtered out during the extrapolation process. Reconstructing the original wavefield, after removing the noise, can be done by upward continuing the wavefield back to z according to the mathematical function of multiple variables indicated or represented by $$\psi(x, z, \omega) = \int_{\mathbb{R}} \psi(x', z + \Delta z, \omega) W^*(x - xi, k(x), \Delta z) dx', \quad \text{(equation 5)}$$

where "*" indicates the complex conjugate (equation 6). A complex conjugate, as is known and understood by those skilled in the art, can be defined as one or a pair of complex numbers, each having the same real parts but with imaginary parts that differ in sign. For example, the numbers 2+3i and 2−3i are complex conjugates of each other as is known and understood by those skilled in the art.

A similar, yet more efficient, result can be obtained by inserting equation 1 into equation 5 to obtain a multi-variable mathematical function indicated or represented by $$\psi(x, z + \Delta z, \omega) = \int_{\mathbb{R}} \psi(x', z, \omega) P(x - xi, k(x), \Delta z) dx', \quad \text{(equation 7)}$$

where (equation 8)

$$P(x - x', k(x), \Delta z) = \int_{\mathbb{R}} W(x - x', k(x), \Delta z) W^*(x - x', k(x), \Delta z) dx'.$$

Expressing equation 6 in the wavenumber form provides a multi-variable mathematical function indicated or represented by $$P(x - xi, k(x), \Delta z) = \frac{1}{2\pi} \int_{\mathbb{R}} \left|\hat{W}(k_x, k(x), \Delta z)\right|^2 e^{-ik_x(x - x')} dk_x. \quad \text{(equation 9)}$$

According to an exemplary embodiment of the present invention, the nonstationary convolution operator P (equation 8), does not have any phase information but can, for example, handle strong lateral variation. The nonstationary convolution operator (equation 8) can also exclude, for example, both the thin lens and focusing terms and can only perform localized filtering using the velocity information at each spatial lateral position. The noise removed by equation 8, according to an embodiment of the present invention, is similar to the noise removed after the backward and forward extrapolation technique employed in some currently-existing seismic image filters, but the overall filtering process using equation 8 is much more efficient than other filtering processes because only a single extrapolation is required and the unfiltered data can remain unsorted.

The nonstationary convolution operators (equation 8) designed by equation 7, according to various exemplary embodiments of the present invention, can be, for example, infinitely long. Using simple window functions to truncate such nonstationary convolution operators is suboptimal and can lead, for example, to numerically unstable operators. For noise suppression application, the numerical instability is less pronounced than in depth imaging because the number of depth steps is relatively small. That is, the wavefield only needs to be extrapolated to a depth level that is just below the propagation zone of the unwanted seismic noise in order to filter the unfiltered seismic image data.

Numerical instability is a major problem of seismic image filters employing extrapolation processes, but various embodiments of the present invention are capable of designing stable wavefield extrapolators. According to an exemplary embodiment of the present invention, the nonstationary convolution operator (equation 8) can be designed, for example, using a weighted least squares with a transition band approach as is known and understood by those skilled in the art. In the presence of complex near surface geology, including, for example, rugged topography or complex geological structures, seismic surface waves can have complicated wave paths and lateral velocity variations. Accordingly, noise attenuation systems, machines, computer readable program products, and associated methods, according to various exemplary embodiments of the present invention, must be able to handle the strong lateral velocity variation of the seismic wavefield. Generally, wavefield extrapolation methods are powerful in handling lateral velocity variations; however, the stability of the wavefield extrapolators can be an important issue when designing wavefield extrapolators. The stability problem can arise, for instance, due to the presence of discontinuities at boundaries separating the wavelike and evanescent regions of a wavefield.

Least squares methods can be used, for example, to design wavefield extrapolators that practically remain stable in a recursive scheme by minimizing the squared error between desired and actual data, or transforms. Least squares methods can be classified into three major categories: (1) unweighted least squares followed by a windowing function applied in the space-frequency domain, (2) weighted least squares using a smooth transition function connecting the wavefield and evanescent regions, and (3) weighted least squares using a transition band, i.e., applying zero weight to select data points, for the transition region. Various embodiments of the present invention apply the third approach which removes a select region, called a transition band, from the extrapolation function. Using a transition band in the weighted least squares filter design can lead to a more stable design than using a transition function, such as a spline, for the transition region.

More particularly for wavefield extrapolators to function adequately, the amplitude and phase of such wavefield extrapolators, in the wavenumber domain, often must match the amplitude and phase of the exact spectrum in the wavelike region, and be only less than unity in the evanescent region. When using a weighted least squares with a transition approach to design nonstationary convolution operators according to various embodiments of the present invention, however, the extrapolator design problem can be made much more flexible through the introduction of a transition region between the wavelike and evanescent regions. Such a formulation fits the way filter specifications are usually given much more efficiently than designating one wavenumber to specify the boundary between the wavelike and the evanescent regions. More over, using a weighted least squares with a transition band approach according to various embodiments of the present invention beneficially minimizes the Gibbs phenomenon, and the approximation in the wavelike and evanescent regions can be dramatically improved.

The weighted least squares approach beneficially employs a transition function. Particular a spline function can be constructed that goes from a mathematical variable $k_\alpha$ to the Nyquist wavenumber indicated or represented by $\pi/\Delta x$. In such a case, the evanescent region of the unfiltered wavefield becomes the transition region. Furthermore, the desired spectrum, indicated or represented by $\hat{W}_D$, does not have the slope discontinuities that are present in the exact spectrum, indicated or represented by $\hat{W}$, which can cause an inaccurate approximation. An extrapolator stabilized using a weighted least squares with a transition band approach can be obtained using a mathematical function indicated or represented by $\tilde{W}=[\underline{F}^H\underline{Y}\underline{F}]^{-1}\underline{F}^H\underline{Y}\hat{W}_D$.

Using a transition region in the desired spectrum can significantly reduce the Gibbs phenomenon and give greater control over the design process. The transition region, for example, allows for a smooth transition between the wavelike and evanescent regions of the unfiltered wavefield. One of the most effective modifications of the least squares error design methods is to change the band of wavenumbers over which the minimization is carried out. The band of wavenumbers for the transition band can, for example, be simply removed from the error definition. This region can be referred to as the transition band or "don't care" region. Beneficially, in the weighted least squares using a transition band approach according to various embodiments of the present invention, the desired spectrum is the exact spectrum. That is, the exact spectrum is not modified by using a transition function as was the case in a simple weighted least squares approach. Rather, the weighted least squares with a transition band approach according to various embodiments of the present invention uses a different weight function that can be defined as:

$$\tilde{Y}(k_x) = \begin{cases} 1; & |k_x| \leq k_\alpha \\ 0; & k_\alpha < |k_x| < |2k - k_\alpha| \\ \varepsilon; & |2k - k_\alpha| < |k_x| < \frac{\pi}{\Delta x} \end{cases}$$

The region $k_\alpha < |k_x| < |2k-k_\alpha|$ is called the transition band, where it is excluded from the error measure by giving it a weight value of zero. Accordingly, a weighted least squares with a transition band convolution operator according to an exemplary embodiment of the present invention can then be designed using $\tilde{W}=[\underline{F}^H\underline{Y}\underline{F}]^{-1}\underline{F}^H\tilde{\underline{Y}}\hat{W}$. Such an approach, should yield a smaller squared error and a greater reduction of overshoot than should be expected using a transition function because there is no constraint placed on the exact spectrum, $\hat{W}$, in the transition region.

Figure 8:
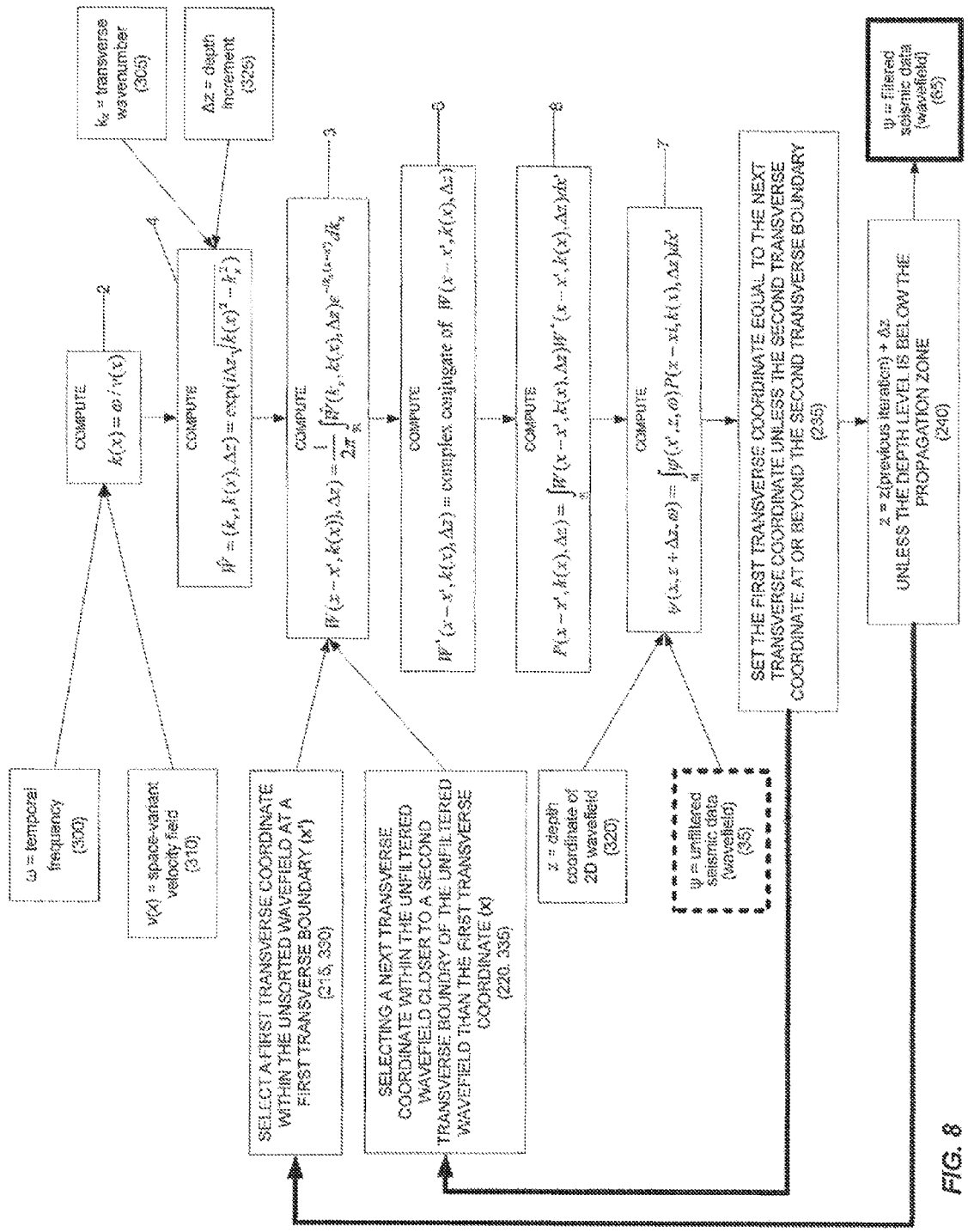
FIG. 8 is a low-level, detailed schematic block mathematical flow diagram illustrating various mathematical calculations and manipulations of unfiltered seismic image data performed in a doubly-recursive process by a nonstationary seismic data filter in order to generate a filtered seismic data image through a single downward extrapolation of unfiltered seismic image data according to an exemplary embodiment of the present invention.

As is perhaps best illustrated in FIG. 5 and FIG. 8, the above described mathematical functions and operators can be used as a part of computer implemented methods, systems, machines, and computer readable program products, according to various embodiments of the present invention, to generate filtered seismic image data through a single extrapolation by constructing a plurality of nonstationary convolution operators to perform localized filtering at each of a plurality of spatial locations of a two-dimensional unsorted, unfiltered pressure wavefield constructed from unfiltered seismic image data. A computer implemented method according to an exemplary embodiment of the present invention can include, for example, the steps of receiving from a seismic image receiver at a recording surface a plurality of seismic energy signals that have propagated throughout a two-dimensional surface wave propagation zone (block 200), converting the plurality of seismic energy signals received from the seismic energy receiver into unfiltered, unsorted seismic image data (block 205), constructing, based on the plurality of unfiltered, unsorted seismic image data, a two-dimensional, unsorted, unfiltered pressure wavefield including a plurality of spatial locations each defined by a transverse coordinate and a depth coordinate (block 210), and locating a selected one of the plurality of spatial locations at a point where the depth level coordinate of the selected one of the plurality of spatial locations is equal to a depth level coordinate of the recording surface and the transverse coordinate of the selected one of the plurality of spatial locations is equal to a transverse coordinate of a first transverse boundary of the two-dimensional surface wave propagation zone (block 215).

As is perhaps illustrated best in FIG. 8, such a computer implemented method according to an exemplary embodiment of the present invention can further include the steps of:

(a) determining, for the selected one of the plurality of spatial locations within the two-dimensional, unsorted, unfiltered pressure wavefield, a space-variant velocity (indicated or represented by v(x)) (block 310) based on the transverse coordinate (block 215, 330) of the selected one of the plurality of spatial locations (indicated or represented by x');

(b) determining, responsive to determining the space-variant velocity (v(x)) (block 310), for the selected one of the plurality of spatial locations within the two-dimensional, unsorted, unfiltered pressure wavefield, a quotient of a temporal frequency of the selected one of the plurality of spatial locations (indicated or represented by ω) (block 300) and the space-variant velocity of the selected one of the plurality of spatial locations (v(x)) (block 310) to thereby define a mathematical function indicated or represented by k(x) (equation 2);

(c) determining responsive to determining k(x) (equation 2), for the selected one of the plurality of spatial locations within the two-dimensional, unsorted, unfiltered pressure wavefield, an exponential function of a product of (i) a square root of negative one (indicated or represented by the imaginary number, i), (ii) a preselected wavefield depth increment (indicated or represented by $\Delta z$) (block 325), and (iii) a square root of (1) a square of a transverse wavenumber of the selected one of the plurality of spatial locations (indicated or represented by $k_x$) (block 305) subtracted from (2) a square of k(x) ($\sqrt{k(x)^2-k_x^2}$), to thereby define a multi-variable mathematical function indicated or represented by $\hat{W}(k_x, k(x), \Delta z)$ (equation 4);

(d) determining responsive to determining $\hat{W}(k_x, k(x), \Delta z)$ (equation 4), for the selected one of the plurality of spatial locations within the two-dimensional, unsorted, unfiltered pressure wavefield, a product of (i) a quotient of one and a product of two and pi (indicated or represented by π)

$$\left(\frac{1}{2\pi}\right),$$

and (ii) an integral over a set of real numbers, (indicated or represented by $\Re$ ), with respect to the transverse wavenumber of the selected one of the of the plurality of spatial locations ($k_x$) (block 305), of a product of $\hat{W}(k_x, k(x), \Delta z)$ (equation 4) and an exponential function of: (1) a product of negative square root of negative one (indicated or represented by the imaginary number, i), (2) the transverse wavenumber of the selected one of the plurality of spatial locations ($k_x$) (block 305), and (3) a difference between the transverse coordinate of the selected one of the plurality of spatial locations (indicated or represented by x') (block 215,330) and a transverse coordinate of a second one of the plurality of spatial locations (indicated or represented by x) (block 220, 335) where the second one of the plurality of spatial locations is located at a point closer to a second transverse boundary of the two-dimensional surface wave propagation zone than the selected one of the plurality of spatial locations $$\left(\frac{1}{2\pi}\int_R \hat{W}(k_x, k(x), \Delta z)e^{-ik_x(x-x')}dk_x\right),$$

to thereby define a multi-variable mathematical function indicated or represented by W(x-x', k(x), $\Delta z$) (equation 3);

(e) determining responsive to determining W(x-x', k(x), $\Delta z$) (equation 3), a complex conjugate of W(x-x', k(x), $\Delta z$) (equation 3) to thereby define a multi-variable mathematical function indicated or represented by W*(x-x', k(x), $\Delta z$) (equation 6);

(f) building responsive to determining W(x-x', k(x), $\Delta z$) (equation 3) and determining W*(x-x', k(x), $\Delta z$) (equation 6), a nonstationary convolution operator for the selected one of the plurality of spatial locations within the two-dimensional, unsorted, unfiltered pressure wavefield by taking an integral over a set of real numbers ($\Re$ ), with respect to the transverse coordinate of the selected one of the plurality of spatial locations (x') (block 215, 330), of a product of W(x-x k(x), $\Delta z$) (equation 3) and W*(x-x', k(x), $\Delta z$) (equation 6) to thereby define a multi-variable mathematical function indicated or represented by P(x-x', k(x), $\Delta z$) (equation 8);

(g) extrapolating the two-dimensional, unsorted, unfiltered pressure wavefield at the selected one of the plurality of spatial locations within the two-dimensional, unsorted, unfiltered pressure wavefield (block 215, 330) using the nonstationary convolution operator for the selected one of the plurality of spatial locations built by the computer (equation 8) by taking an integral over a set of real numbers ($\Re$ ) of a product of P(x-x', k(x), $\Delta z$) (equation 8) and the two-dimensional, unsorted, unfiltered pressure wavefield (indicated or represented by $\Psi$(x, z+$\Delta$z, ω)

$$\left(\int_R \psi(x', z, \omega)P(x-xi, k(x), \Delta z)dx'\right)$$

(block 35), to thereby perform localized filtering of the selected one of the plurality of spatial locations;

(h) setting the transverse coordinate of the selected one of the plurality of spatial locations (x') equal to the transverse coordinate of the second one of the plurality of spatial locations (x) (block 235);

(i) repeating steps (a) through (h) until the transverse coordinate of the second one of the plurality of spatial locations (x) equals or exceeds the transverse coordinate of the second transverse boundary of the two-dimensional surface wave propagation zone (block 235);

(j) increasing the depth level coordinate (z) by the preselected wavefield depth increment ($\Delta z$) (block 240);

(k) setting the transverse coordinate of the selected one of the plurality of spatial locations ($k_x$) equal to the transverse coordinate of the first boundary of the two-dimensional surface wave propagation zone (block 215, 330); and (l) repeating steps (a) through (k) until the depth level coordinate (z) is equal to a depth below the two-dimensional surface wave propagation zone of the plurality of seismic energy signals (block 240) to thereby generate filtered seismic image data (block 65) that when processed further by the computer can create a filtered seismic image to be displayed on a display adapted to be in communication with the computer, each repetition of steps (a) through (k) being defined as an iteration.

Furthermore, step of building the nonstationary convolution operator for the selected one of the plurality of spatial locations within the two-dimensional, unsorted, unfiltered pressure wavefield can further include, for example, the step of stabilizing the nonstationary convolution operator using a weighted least squares with a transition band approach as is known and understood by those skilled in the art. Furthermore, the step of constructing a two-dimensional unfiltered pressure wavefield can further include, for example, the step of performing a Fourier transformation of the two-dimensional unfiltered pressure wavefield over a temporal coordinate. Additionally, according to an embodiment of the present invention, the computer implemented method can further include the steps of generating at each iteration, filtered seismic image data responsive to extrapolating the two-dimensional unfiltered pressure wavefield at the selected one of the plurality of spatial locations within the two-dimensional unfiltered pressure wavefield, and processing the filtered seismic image data generated at each iteration to thereby create a human-readable filtered seismic image to be transmitted to an output device adapted to be in communication with the computer.

Moreover, such a computer implemented method according to an embodiment of the present invention can further include the steps of storing the unfiltered, unsorted seismic image data in a first database positioned to be in communication with the computer, storing the two-dimensional unfiltered pressure wavefield in a second database positioned to be in communication with the computer, storing, at each iteration, the filtered seismic image data in a third database positioned to be in communication with the computer, storing the filtered seismic image in a fourth database positioned to be in communication with the computer; processing the filtered seismic image data to create a human-readable filtered seismic image; and transmitting the filtered seismic image to an output device positioned to be in communicated with the computer. Each aforementioned step of any method according to an embodiment of the present invention can be performed by a computer in one or more computer processes, and the steps of any particular method according to an exemplary embodiment of the present invention can all be performed by the computer in a one computer process or can each be performed by the computer in one or more separate computer processes.

Figure 9:
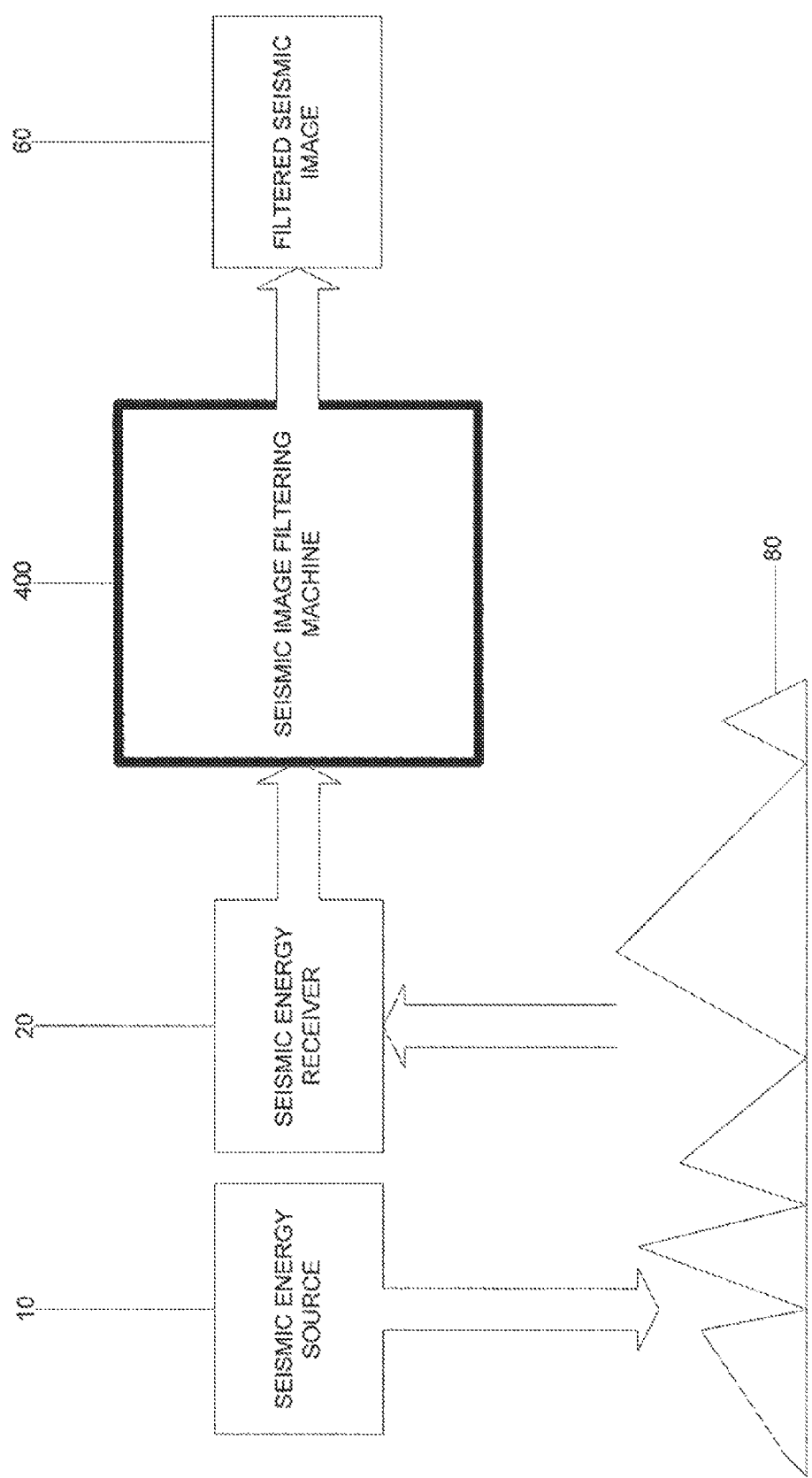
FIG. 9 is a high-level schematic block flow diagram illustrating the use of a seismic image filtering machine to create a filtered seismic image responsive to filtered seismic image data generated by attenuating coherent seismic noise from surface waves of an unfiltered wavefield constructed from unfiltered seismic image data through a single downward extrapolation of the unfiltered wavefield using a plurality of nonstationary convolution operators to perform localized filtering at each of a plurality of spatial locations of the unfiltered wavefield according to an exemplary embodiment of the present invention.

As is perhaps best illustrated in FIG. 9, various embodiments of the present invention can also provide a seismic image filtering machine to create a filtered seismic image responsive to filtered seismic image data generated by attenuating coherent seismic noise from surface waves of an unfiltered wavefield constructed from unfiltered seismic image data through a single downward extrapolation of the unfiltered wavefield using a plurality of nonstationary convolution operators to perform localized filtering at each of a plurality of spatial locations of the unfiltered wavefield. Particularly, FIG. 9 illustrates, using a high-level schematic block flow diagram, the use of such a seismic image filtering machine according to various exemplary embodiments of the present invention. Generally, a seismic energy source (block 10) can be positioned to propagate seismic energy signals into a propagation zone (block 80). Such seismic energy can include any seismic or acoustic energy whether from an explosive, implosive, swept-frequency, or random sources. Furthermore, a seismic energy receiver (block 20) can be positioned to receive and record seismic energy data or seismic field records in any form, including but not limited to, a geographical time series recording of the acoustic reflection and refraction of waveforms that travel from the seismic energy source (block 10) to the seismic energy receiver (block 20). Variations in the travel times of reflection and refraction events in one or more field records in seismic data processing can produce a seismic image, defined by unfiltered seismic image data, that demonstrates subsurface structure according to an exemplary embodiment of the present invention. Beneficially, such a seismic image can be used to aid in the search for, and exploitation of, subsurface mineral deposits; however, in order for the seismic image to be of the greatest functionality, it must first be filtered.

Accordingly, according to various embodiments of the present invention, such a seismic image can be beneficially filtered, for example, using a seismic image filtering machine (block 400). According to an exemplary embodiment of the present invention, a seismic filtering machine (block 400) can use a nonstationary seismic image filter that is implemented in the space-frequency domain and includes nonstationary convolution operator designed using a weighted least squares with a transition band approach. Such a seismic image filtering machine (block 400) can be configured according to an exemplary embodiment of the present invention, for example, to attenuate coherent seismic energy, or noise, from seismic images. Particularly, such a seismic image filtering machine (block 400), according to an exemplary embodiment of the present invention, can apply a nonstationary convolution operator to downwardly continue unfiltered seismic image data that defines an unfiltered seismic image to a depth level below the propagation zone to generate new filtered seismic image data that, when processed by the computer and transmitted to a display adapted to be in communication with the computer, creates a filtered seismic image.

As is perhaps best illustrated in FIG. 9, such a seismic image filtering machine 400 according to various exemplary embodiments of the present invention can include, for example, a first database 422 storing unfiltered, unsorted seismic image data derived from a plurality of seismic energy signals received from a seismic energy receiver at a recording surface after propagating throughout a surface wave propagation zone, and a computer 410 adapted to be in communication with the first database 422 and having at least a processor 416 and memory 412. A seismic image filtering machine 400 can also include, for example, an unfiltered wavefield constructor computer readable program product 430 stored in a tangible computer readable storage medium and including instructions that, when executed by the computer 410, cause the computer 410 to perform the operation of constructing an unfiltered wavefield delineated by a plurality of spatial locations from the unfiltered, unsorted seismic image data stored in the first database 422. Moreover such a seismic image filtering machine can further include, for example, a nonstationary convolution operator builder computer readable program product 431 stored in a tangible computer readable storage medium and including instructions that, when executed by the computer 410, cause the computer 410 to perform the operation of building, responsive to the unfiltered wavefield constructer computer readable program product 430, a plurality of nonstationary convolution operators, one for each of the plurality of spatial locations of the unfiltered wavefield, each of the nonstationary convolution operators being based on the coordinate location of each of the plurality of spatial locations of the unfiltered wavefield and a space-variant velocity, temporal frequency, transverse wavenumber, and wavelength of the unfiltered wavefield at each spatial location.

Also according to various exemplary embodiments of the present invention, a seismic image filtering machine 400 can also include a nonstationary convolution operator stabilizer computer readable program product 432 stored in a tangible computer readable storage medium and including instructions that, when executed by the computer 410, cause the computer 410 to perform the operation of stabilizing each of the nonstationary convolution operators using a weighted least squares with a transition band approach as is known and understood by those skilled in the art. Beneficially, such a seismic image filtering machine can further include, for example, a localized filter computer readable program product 434 stored in a tangible computer readable storage medium and including instructions that, when executed by the computer 410, cause the computer 410 to perform the operation of locally filtering each of the plurality of spatial locations of the unfiltered wavefield using, at each spatial locations, at least one of the plurality of nonstationary convolutions operators associated with that one of the plurality of spatial locations to thereby effectuate a single downward extrapolation of the unfiltered wavefield. Furthermore, a seismic image filtering machine can include, for example, a filtered seismic image creator computer readable program product 436 stored in a tangible computer readable storage medium and including instructions that, when executed by the computer 410, cause the computer 410 to perform the operation of creating a filtered seismic image responsive to filtered seismic image data generated by filtering, in the localized filter computer readable program product 434, the unfiltered wavefield at each of the plurality of spatial locations of the unfiltered wavefield.

Beneficially, a seismic image filtering machine 400, according to various embodiments of the present invention can also include, by way of example, a display 414, a second database 424, a third database 428, and a fourth database 426, each adapted to be in communication with the computer. Additionally, the unfiltered wavefield constructor computer readable program product 430 can, for example, further include instructions that, when executed by the computer 410, cause the computer 410 to perform the operation of storing the unfiltered wavefield in the second database 424. Similarly, the localized filter computer readable program product 434 can further include, for example, instructions that, when executed by the computer 410, cause the computer 410 to perform the operation of storing the filtered seismic image data in the third database 428. The filtered seismic image creator computer readable program product 436 can also include, for example, instructions that, when executed by the computer 410, cause the computer 410 to perform the operation of storing the filtered seismic image in the fourth database 426. Furthermore, a seismic image filtering machine 400, according to an exemplary embodiment of the present invention can further include a filtered image displayer computer readable program product 438 stored in a tangible computer readable storage medium and including instructions that, when executed by the computer 410, cause the computer 410 to perform the operation of displaying the filtered seismic image on the display 414 responsive to converting the filtered seismic image data into a graphic image capable of being displayed on the display in human-readable form.

Also according to exemplary embodiments of the present invention, each of the of the plurality of nonstationary convolution operators built by the nonstationary convolution operator builder computer readable program product 431 can be beneficially different from each of the others of the plurality of nonstationary convolution operators and can be, for example, uniquely associated with one of the plurality of spatial locations of the unfiltered wavefield. Moreover, the operation of filtering by the localized filter computer readable program product 434 can be implemented, for example, in one of, or both, a seismic energy source domain or a seismic energy receiver domain. Additionally, the propagation zone, as is known and understood by those skilled in the art, can include complex geology and rugged topography, and the unfiltered wavefield can include coherent seismic noise in the form of evanescent waves that have propagated throughout the surface wave proposition zone in complicated wave paths due to the complex geology and rugged topography within the propagation zone.

Beneficially, the nonstationary convolution operator builder computer readable program product 431 further includes instructions that, when executed by the computer 410, cause the computer 410 to perform the operations of determining, for a selected one of the plurality of spatial locations within the unfiltered wavefield, a space-variant velocity (indicated or represented by v(x)), determining, for the selected one of the plurality of spatial locations within the unfiltered wavefield, a quotient of a temporal frequency (indicated or represented by (p) and the space-variant velocity of the selected one of the plurality of spatial locations to thereby define a mathematical function indicated or represented by k(x), and determining, for the selected one of the plurality of spatial locations within the unfiltered wavefield, an exponential function of a product of (i) a square root of negative one (indicated or represented by the imaginary number, i), (ii) a preselected wavefield depth increment (indicated or represented by $\varDelta z$), and (iii) a square root of (1) a square of a transverse wavenumber (indicated or represented by $k_x$) of the selected one of the plurality of spatial locations subtracted from (2) a square of k(x) ( $\sqrt{k(x)^2 - k_x^2}$ ), to thereby define a multi-variable mathematical function indicated or represented by $\hat{W}(k_x, k(x), \varDelta z)$. The nonstationary convolution operator builder computer readable program product 431 can also include instructions that, when executed by the computer 410, cause the computer 410 to perform the operation of determining, for the selected one of the plurality of spatial locations within the unfiltered wavefield, a product of (i) a quotient of one and a product of two and pi (indicated or represented by $\pi$)

$\left(\frac{1}{2\pi}\right)$, and (ii) an integral over a set of real numbers (indicated or represented by $\Re$) with respect to a transverse wavenumber of the selected one of the of the plurality of spatial locations ($k_x$), of a product of $\hat{W}(kx, k(x), \Delta z)$ and an exponential function of: (1) a product of negative square root of negative one (indicated or represented by the imaginary number, i), (2) the transverse wavenumber of the selected one of the plurality of spatial locations ($k_x$), and (3) a difference between the coordinate location of the selected one of the plurality of spatial locations (indicated or represented by x') and a coordinate location of a second one of the plurality of spatial locations (indicated or represented by x), to thereby define a multi-variable mathematical function indicated or represented by $W(x-x', k(x), \Delta z)$. Furthermore, such a nonstationary convolution operator builder computer readable program product 431 according to an exemplary embodiment of the present invention can further include, for example, instructions that, when executed by the computer 410, cause the computer to perform the operation of determining an integral over a set of real numbers ($\Re$), with respect to the coordinate location of the selected one of the plurality of spatial location (indicated or represented by x'), of a product of $W(x-x', k(x), \Delta z)$ and a complex conjugate of $W(x-x', k(x), \Delta z)$ to thereby build a nonstationary convolution operator.

Moreover, a localized filter computer readable program product 434, can further include, for example, instructions that, when executed by the computer 710, cause the computer 710 to perform the operation of downward continuing the unfiltered wavefield at each of the plurality of spatial locations of the unfiltered wavefield to a depth level below the surface wave propagation zone of the seismic energy signals. Additionally, according to various exemplary embodiments of the present invention, the unfiltered wavefield constructed by the unfiltered wavefield constructor computer readable program product 430 can be Fourier transformed over a temporal coordinate prior to its use by a seismic image filtering machine 400. Furthermore, the localized filter computer readable program product 434 can further include, for example, instructions that when executed by the computer 410 cause the computer 410 to perform the operation of generating, for each of the plurality of spatial locations of the unfiltered wavefield, filtered seismic image data responsive to filtering each of the plurality of spatial locations. Accordingly, the filtered seismic image created by filtered seismic image creator computer readable program product 436 can be based, for example, on the filtered seismic image data.

Figure 11:
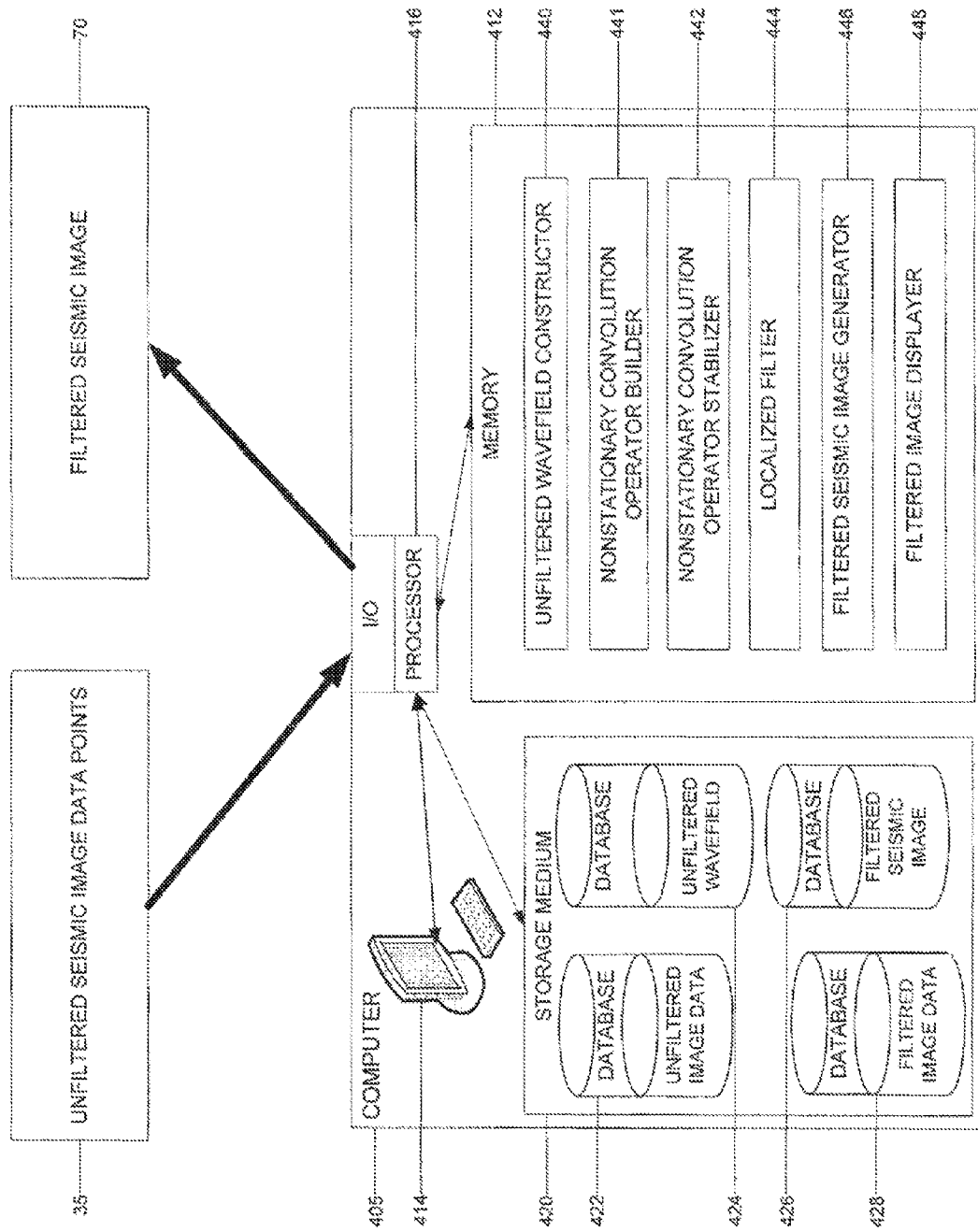
FIG. 11 is a low-level schematic block flow diagram of a seismic image filtering system to generate a filtered seismic image based on seismic image data filtered by attenuating coherent seismic noise from surface waves of an unfiltered wavefield constructed from the seismic image data through a single downward extrapolation using a plurality of nonstationary convolution operators to perform localized filtering at each of a plurality of spatial locations of the unfiltered wavefield according to an exemplary embodiment of the present invention.

As is perhaps best illustrated in FIG. 11, various exemplary embodiments of the present invention also provide a system to generate a filtered seismic image responsive to seismic image data filtered by attenuating coherent seismic noise from surface waves of an unfiltered wavefield constructed from the seismic image data using a plurality of nonstationary convolution operators to perform localized filtering at each of a plurality of spatial locations of the unfiltered wavefield. Such a system can include, for example, a tangible computer readable medium storing unfiltered seismic image data 35 and a computer 405 including at least a memory 412, a display 414, a processor 416, and a computer readable storage medium 420. The memory can further include, for example, a first database 422 to store unfiltered seismic image data, a second database 424 to store an unfiltered wavefield, a third database 428 to store filtered seismic image data, and a fourth database 426 to store a filtered seismic image capable of being displayed in human-readable form on the display 414 adapted to be in communication with the computer 405. The memory of the computer can further include, for example, an unfiltered wavefield constructor 440, a nonstationary convolution operator builder 441, a nonstationary convolution operator stabilizer 442, a localized filter 444, a filtered seismic image generator 446, and a filtered image displayer 448. Generally, such a system, according to various embodiments of the present invention, receives as input unfiltered seismic image data 35 and returns as output to a display a filtered seismic image 70.

More particularly, the unfiltered wavefield constructor 440 can be configured, for example, to construct an unfiltered wavefield delineated by a plurality of spatial locations from the unfiltered, unsorted seismic image data stored in the first database 442. Additionally, the nonstationary convolution operator builder 441 can, for example, be configured to build, responsive to the unfiltered wavefield constructer 440, a plurality of nonstationary convolution operators, one for each of the plurality of spatial locations of the unfiltered wavefield, each of the nonstationary convolution operators being based on a coordinate location of each of the plurality of spatial locations of the unfiltered wavefield and the space-variant velocity, temporal frequency, transverse wavenumber, and wavelength of the unfiltered wavefield at each spatial location. By way of example, the nonstationary convolution operator stabilizer 442 can be configured to stabilize each of the nonstationary convolution operators using a weighted least squares with a transition band approach. Also according to various exemplary embodiments of the present invention, the localized filter 444 can be, for example, configured to locally filter each of the plurality of spatial locations of the unfiltered wavefield using, at each spatial locations, at least one of the plurality of nonstationary convolutions operators associated with that one of the plurality of spatial locations to thereby effectuate a single downward extrapolation of the unfiltered wavefield. Moreover, the filtered seismic image generator 446 can, for example, be configured to generate a filtered seismic image responsive to filtered seismic image data generated by the localized filter at each of the plurality of spatial locations of the unfiltered wavefield, and the filtered image displayer 448 can be, for example, configured to display the filtered seismic image on the display 414.

Figure 13:
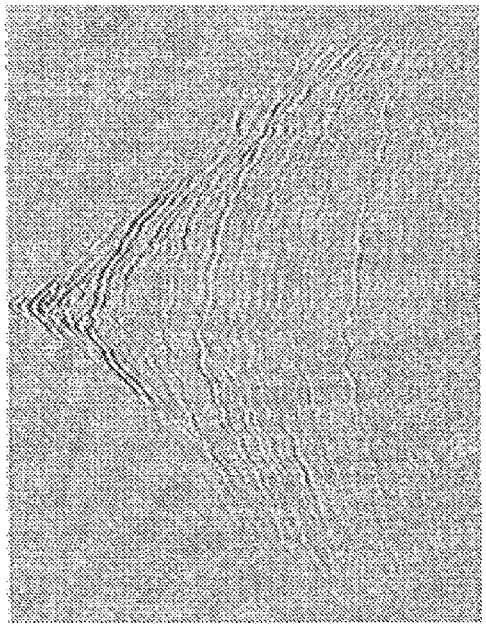
FIG. 13 is a filtered seismic image, specifically, a shot gather, produced using a synthetic dataset modeled over complex geology and rough topography and filtered according to an embodiment of the present invention.
Figure 12:
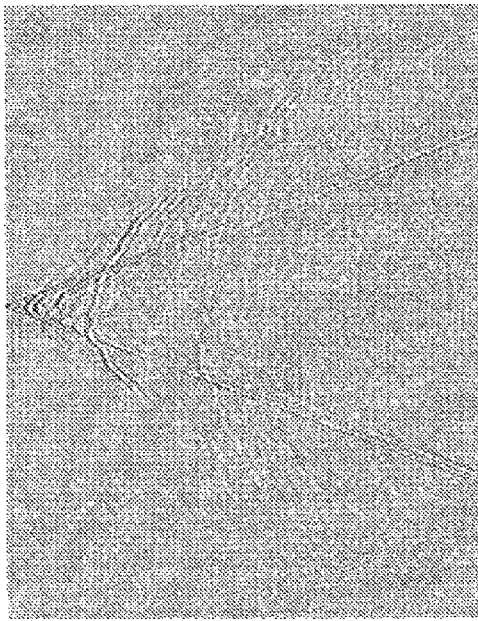
FIG. 12 is an unfiltered seismic image, specifically, a shot gather, produced using a synthetic dataset modeled over complex geology and rough topography according to an embodiment of the present invention.
Figure 14:
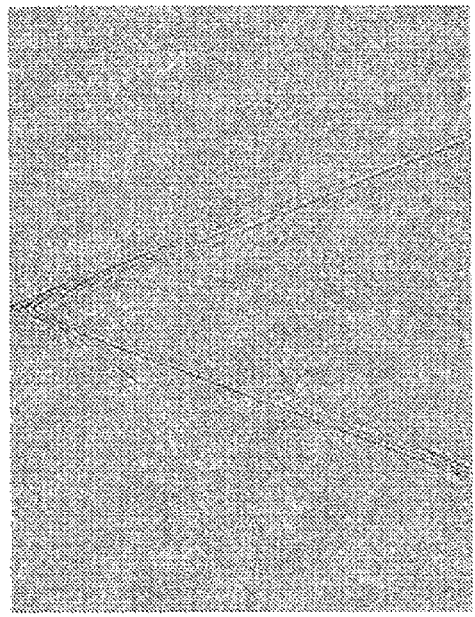
FIG. 14 is the difference between the results in FIG. 12 and FIG. 13 calculated by subtracting the filtered seismic image of a synthetic dataset (FIG. 13) from the unfiltered seismic image of a synthetic dataset (FIG. 12) according to an embodiment of the present invention.

As is perhaps best illustrated by FIGS. 11 through 21, various exemplary embodiments of the present invention can filter unfiltered seismic images to produce high-quality filtered seismic images. For example, FIG. 12 shows an unfiltered seismic image, specifically, a shot gather, produced using a synthetic dataset modeled over complex geology and rough topography, according to an embodiment of the present invention. In FIG. 12, for example, the receiver spacing is eight (8) meters and the depth step is eight (8) meters. FIG. 13 shows a seismic image, specifically, a shot gather, filtered according to an embodiment of this invention. In this example produced using a synthetic dataset according to an exemplary embodiment of the present invention, the correct velocity model was used, and the unfiltered seismic data 35 was extrapolated to a depth three-hundred (300) meters below the propagation zone. The filtered seismic image in FIG. 13 illustrates that most of the coherent seismic energy has been attenuated by the nonstationary seismic image data filter 40 according to an exemplary embodiment of the present invention. The noise removed by the filter, calculated by subtracting the filtered seismic image data 65 from the unfiltered seismic image data 35, is shown in FIG. 14. Beneficially, FIG. 14 shows that the removed seismic energy, or coherent seismic noise, excludes desired seismic reflection events thus demonstrating the effectiveness of a seismic filter according to an various embodiments of the present invention.

Figure 15:
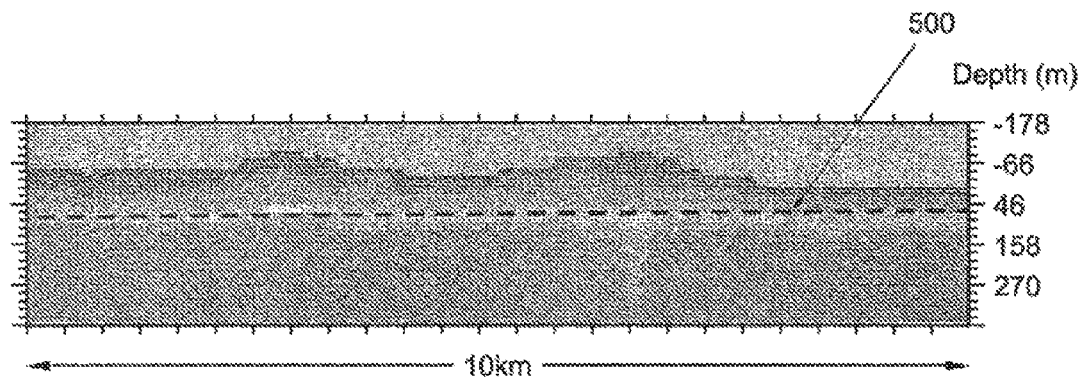
FIG. 15 is a near surface velocity model of a real dataset where refraction tomography was used acquired from an irregular surface with near surface lateral velocity variations according to an embodiment of the present invention.
Figure 16:
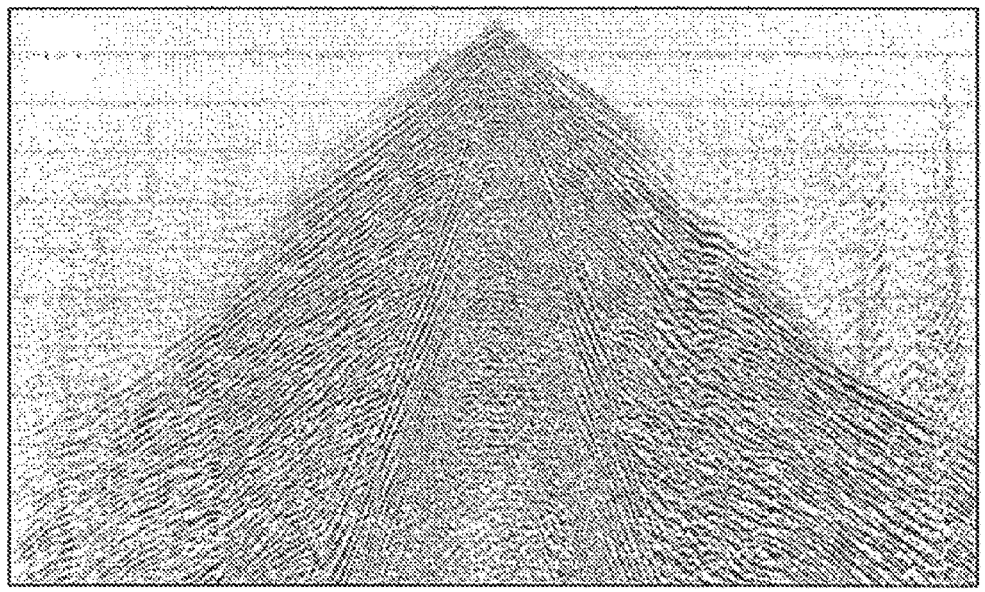
FIG. 16 is an unfiltered seismic image, specifically, a shot gather, produced using a real dataset acquired from an irregular surface with near surface velocity variations according to an embodiment of the present invention.
Figure 17:
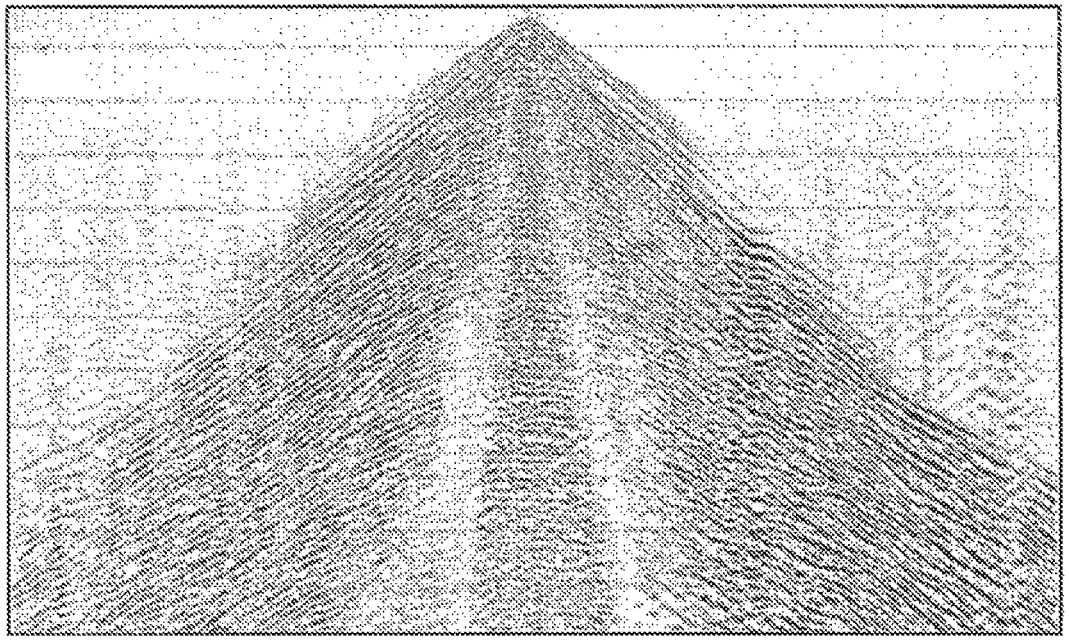
FIG. 17 is a filtered seismic image, specifically, a shot gather, produced using a real dataset acquired from an irregular surface with near surface velocity variations and filtered according to an embodiment of the present invention.
Figure 18:
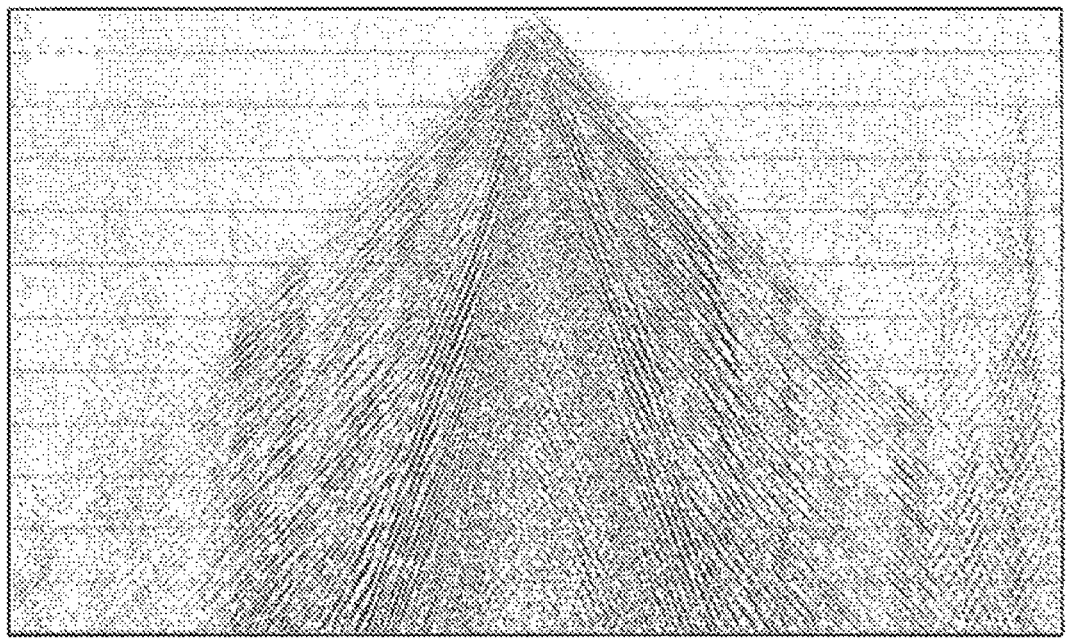
FIG. 18 is the difference between the results in FIG. 16 and FIG. 17 calculated by subtracting the filtered shot gather of a real dataset (FIG. 17) from the unfiltered shot gather of a real dataset (FIG. 16) according to an embodiment of the present invention.

Various embodiments of the present invention also achieve beneficial results, for example, when applied to real, as opposed to synthetic, datasets. For example, FIG. 15 shows a near surface velocity model of a real dataset, where refraction tomography was used, acquired from an irregular surface with near surface velocity variations, according to an embodiment of the present invention. The dashed line 500 indicates the datum to which the data are extrapolated. Furthermore, FIG. 16 shows an unfiltered seismic image, specifically, a shot gather, produced using a real dataset acquired from an irregular surface with near surface velocity variations. FIG. 17 shows the same seismic image as shown in FIG. 16 after it is filtered according to an embodiment of the present invention. The noise removed by the filter, calculated by subtracting the filtered seismic image data from the unfiltered seismic image data, is shown in FIG. 18. FIG. 18 demonstrates that various embodiments of the present invention are effective in attenuating most of the unwanted seismic energy, including, for example, direct arrival and ground roll, without removing the desired seismic reflection energy.

Figures 21, 22:
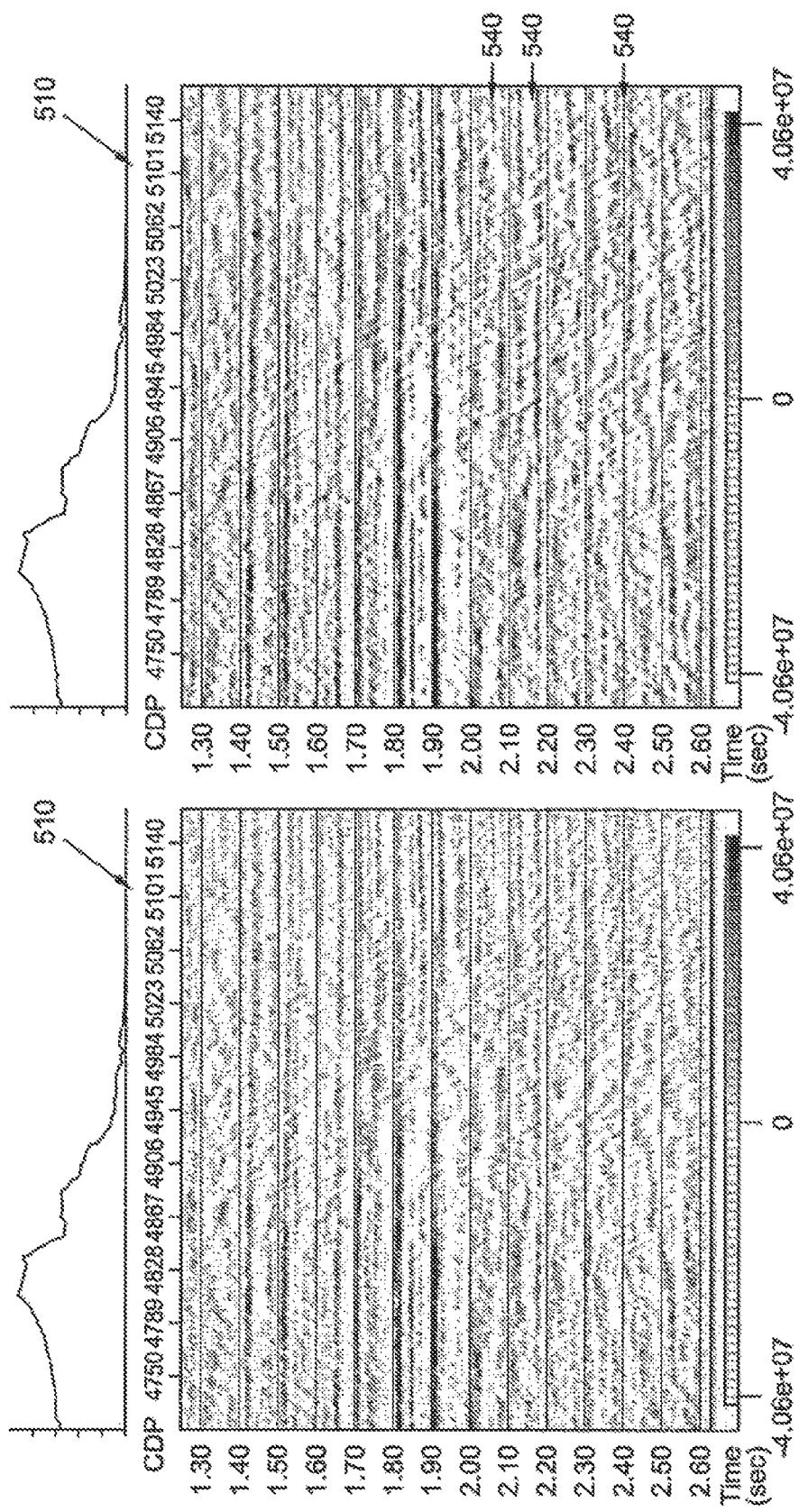
FIG. 21 is an enlarged view of an unfiltered seismic image, specifically, a seismic stack result, produced using a real dataset acquired from a complex, deep geological formation according to an embodiment of the present invention.
FIG. 22 is an enlarged view of a filtered seismic image, specifically, a seismic stack result, produced using a real dataset acquired from a complex, deep geological formation and filtered according to an embodiment of the present invention.

Beneficially, for example, the present invention results in improved image quality for both shallow and deep geological formations. For instance, FIGS. 18 and 19, respectively, show a seismic image, specifically, a seismic stack result, produced using real dataset acquired from a complex, shallow geological formation with and without filtering according to embodiments of the present invention. The elevation profile 510, in meters, showing rough topography, is displayed at the top each of FIGS. 18 and 19. Arrows in FIG. 20 520 indicate areas of improved image quality and illustrate that the image in FIG. 20 has more visible details and focused reflection events than the result illustrated in FIG. 19. Various embodiments of the present invention also produce, for example, enhanced image quality results for deep geological formations. FIGS. 20 and 21, respectively, show a seismic image, specifically, a seismic stack result, produced using a real dataset acquired from a complex, deep geological formation with and without filtering according to the present invention. The elevation profile 530, in meters, showing rough topography, is displayed at the top each of FIGS. 20 and 21. Arrows in FIG. 22 540 indicate areas of improved image quality and show that the image illustrated in FIG. 22 has more visible details and focused reflection events than the result illustrated in FIG. 21.

It is important to note that while embodiments of the present invention have been described in the context of a fully functional system, those skilled in the art will appreciate that the mechanism of at least portions of the present invention or aspects thereof are capable of being distributed in the form of a computer readable program product stored in a tangible computer readable storage medium and a computer readable medium of instructions in a variety of forms for execution on a processor, processors, or the like, and that the present invention applies equally regardless of the particular type of signal bearing media used to actually carry out the distribution. Note, the computer readable program product can be in the form of microcode, programs, routines, and symbolic languages that provide a specific set or sets of ordered operations that control the functioning of the hardware and direct its operation, as known and understood by those skilled in the art.

Figure 10:
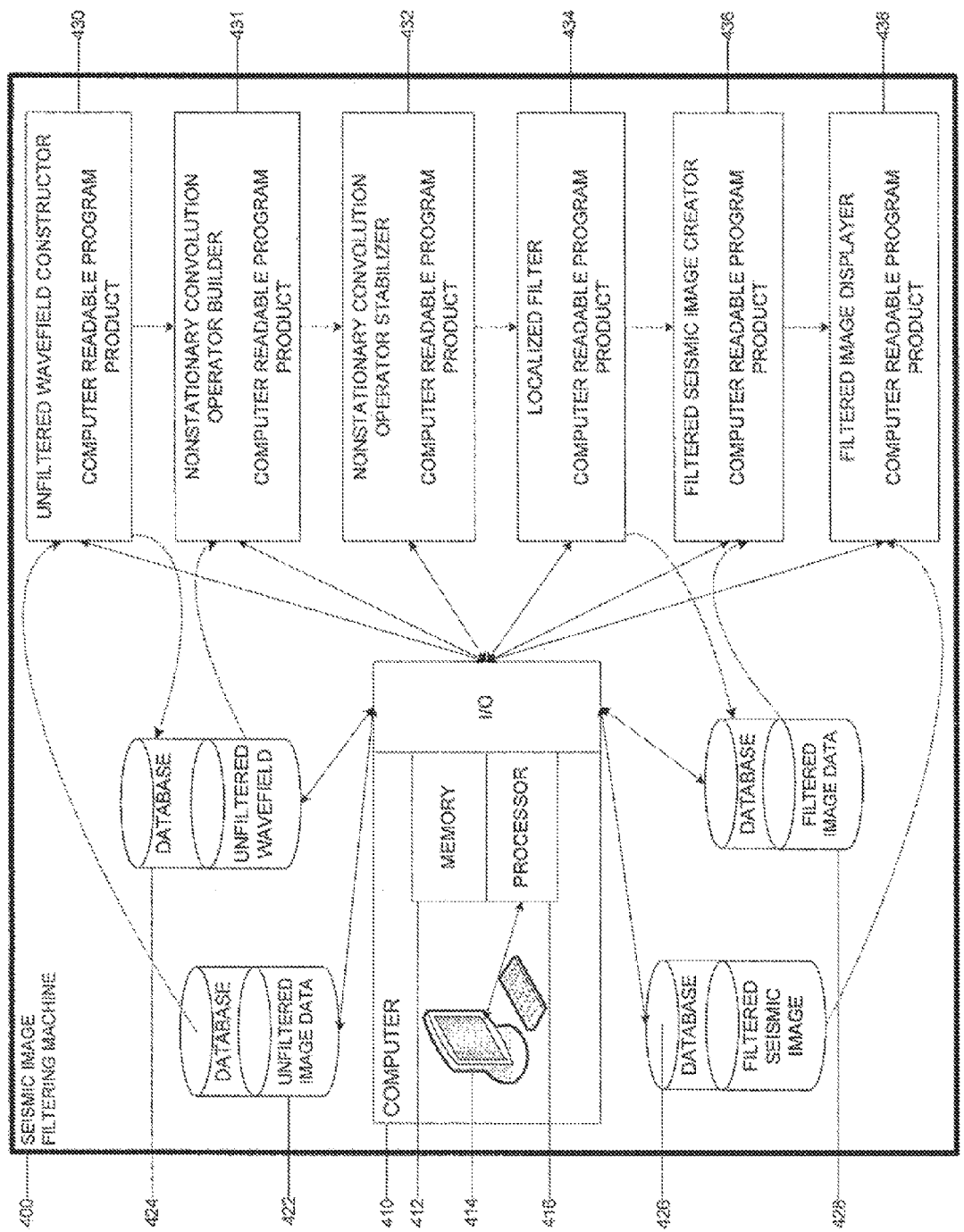
FIG. 10 is a low-level, detailed schematic block flow diagram of a seismic image filtering machine to create a filtered seismic image responsive to filtered seismic image data generated by attenuating coherent seismic noise from surface waves of an unfiltered wavefield constructed from unfiltered seismic image data through a single downward extrapolation of the unfiltered wavefield using a plurality of nonstationary convolution operators to perform localized filtering at each of a plurality of spatial locations of the unfiltered wavefield according to an exemplary embodiment of the present invention.

Note, the computer 405, 410, shown schematically in FIG. 10 and FIG. 11, represents a computer or computer cluster or computer farm and are not limited to any individual physical computers. The number of computers along with associated storage capacity and their architecture and configuration can be increased based on usage, demand, and capacity requirements for the system. Also note, the memory 412 can include volatile and nonvolatile memory known to those skilled in the art including, for example, RAM, ROM, and magnetic or optical disks, just to name a few. Additionally, examples of tangible computer readable storage medium include but are not limited to: nonvolatile hard-coded type media such as read only memories (ROMs), CD-ROMs, and DVD-ROMs, or erasable, electrically programmable read only memories (EEPROMs), recordable type media such as floppy disks, hard disk drives, solid state disk drives, hard disk RAIDs, direct attached storage devices, CD-R/RWs, DVD-RAMs, DVD-R/RWs, DVD+R/RWs, flash drives, memory sticks, HD-DVDs, mini disks, laser disks, Blu-ray disks, and other newer types of memories, and transmission type media such as digital and analog communication links as are known and understood by those skilled in the art. Note additionally, the processor 416 is not limited to any single processor or processor type and can include any number of central processing units, microprocessors, graphics processing units, digital signal processors, network processors, coprocessors, data processors, audio processors, and any other electronic circuits that can evaluate computer readable instructions as is known and understood to those skilled in the art.

Embodiments of the present invention include several advantages. For example, embodiments of the present invention can be sufficiently robust to handle strong lateral velocity variation of seismic surface waves thereby making the present invention an effective tool to attenuate complicated coherent seismic noise. Additionally, embodiments of the present invention, for example, can effectively attenuate coherent seismic noise even over rough topography or complex near surface geology. Moreover a coherent seismic noise filter, according to various embodiments of the present invention, for example, can be implemented in either the seismic source or seismic receiver domains, and the coherent seismic noise filter, for example, can attenuate complicated coherent seismic noise more quickly and efficiently than current systems and methods. Unlike current seismic filtering systems and methods which require multiple data extrapolation processes and a sorted data set, embodiments of the present invention can, for example, enhance the speed and efficiency of current seismic filters by reducing the process steps necessary to filter a seismic image.

In the drawings and specification, there have been disclosed a typical preferred embodiment of the invention, and although specific terms are employed, the terms are used in a descriptive sense only and not for purposes of limitation. Various embodiments of the invention have been described in considerable detail with specific reference to these various illustrated embodiments. It will be apparent, however, that various modifications and changes can be made within the spirit and scope of the invention as described in the foregoing specification and as defined in the appended claims.

The invention claimed is:

1. A computer implemented method to generate a filtered seismic image on a display, the computer implemented method comprising:
constructing, by a computer in a first computer process, an unfiltered wavefield delineated by a plurality of spatial locations from unfiltered, unsorted seismic image data generated responsive to a plurality of seismic energy signals propagated through a surface wave propagation zone;
building, by the computer in a second computer process, a plurality of nonstationary convolution operators, one for each of the plurality of spatial locations of the unfiltered wavefield, responsive to constructing the unfiltered wavefield in the first computer process for each of the plurality of spatial locations of the unfiltered wavefield, each of the plurality of nonstationary convolution operators being different from others of the plurality of nonstationary convolution operators and uniquely associated with one of the plurality of spatial locations of the unfiltered wavefield;
extrapolating, by the computer in a third computer process, responsive to building each of the plurality of nonstationary convolution operators, the unfiltered wavefield at each of the plurality of spatial locations of the unfiltered wavefield to a depth level below the surface wave propagation zone of the seismic energy signals, to thereby locally filter each of the plurality of spatial locations of the unfiltered wavefield; and
generating, by the computer in a fourth computer process, a filtered seismic image on a display, adapted to be in communication with the computer, responsive to each of the plurality of spatial locations of the unfiltered wavefield locally filtered by the computer in the third computer process, the filtered seismic image generated using a single extrapolation and without sorting the seismic image data.

2. The computer implemented method of claim 1, wherein the method to generate a filtered seismic image on a display is further responsive to seismic image data filtered by attenuating coherent seismic noise from surface waves of an unfiltered wavefield through a single downward extrapolation using specially-constructed nonstationary convolution operators to perform localized filtering at each of a plurality of spatial locations of the unfiltered wavefield.

3. The computer implemented method of claim 1, wherein each of the plurality of nonstationary convolution operators being based on a coordinate location of each of the plurality of spatial locations of the unfiltered wavefield within the unfiltered wavefield, and a space-variant velocity, temporal frequency, transverse wavenumber, and wavelength of the unfiltered wavefield at each of the plurality of spatial locations.

4. The computer implemented method of claim 3,
wherein each of the plurality of nonstationary convolution operators, one for each of the plurality of spatial locations of the unfiltered wavefield, are built by performing an inverse Fourier transformation over the transverse wavenumber coordinate of a power of a phase shift operator at each of the plurality of spatial locations of the unfiltered wavefield; and
wherein the step of extrapolating, by the computer in the third computer process responsive to building each of the plurality of nonstationary convolution operators is implemented in one of, or both, a seismic energy source domain or a seismic energy receiver domain.

5. The computer implemented method of claim 4,
wherein the step of constructing, by the computer in the first computer process the unfiltered pressure wavefield further includes the step of performing a Fourier transformation of the unfiltered wavefield over a temporal coordinate;
wherein the computer implemented method further includes the step of generating, by the computer in an eleventh computer process, filtered seismic image data for each of the plurality of spatial locations of the unfiltered wavefield responsive to extrapolating, by the computer in the third computer process the unfiltered wavefield at each of the plurality of spatial locations of the unfiltered wavefield; and
wherein the computer implemented method further includes the step of converting, by the computer in a twelfth computer process, the filtered seismic image data into a graphic image capable of being displayed on the display adapted to be in communication with the computer.

6. The computer implemented method of claim 5, wherein the computer implemented method further includes the step of stabilizing, in a thirteenth computer process by the computer, each of the nonstationary convolution operators built by the computer in the second computer process for each of the plurality of spatial locations of the unfiltered wavefield using a weighted least squares with a transition band approach.

7. The computer implemented method of claim 3, whereby the building, by the computer in a second computer process, a plurality of nonstationary convolution operators, one for each of the plurality of spatial locations of the unfiltered wavefield, responsive to constructing the unfiltered wavefield in the first computer process for each of the plurality of spatial locations of the unfiltered wavefield, further includes:
determining, by the computer in a fifth computer process, for a selected one of the plurality of spatial locations within the unfiltered wavefield, a space-variant velocity based on the coordinate location of the selected one of the plurality of spatial locations within the unfiltered wavefield;
determining, by the computer in a sixth computer process, responsive to the space-variant velocity determined in the fifth computer process, for the selected one of the plurality of spatial locations within the unfiltered wavefield, a quotient of the temporal frequency and the space-variant velocity of the selected one of the plurality of spatial locations, to thereby define a function $k(x)$, wherein x is a selected one of the plurality of spatial locations and $k(x)$ is a quotient of the temporal frequency and the space-variant velocity of the selected one of the plurality of spatial locations;
determining, by the computer in a seventh computer process, responsive to determining the function $k(x)$ in the sixth computer process, for the selected one of the plurality of spatial locations within the unfiltered wavefield, an exponential function of a product of (i) a square root of negative one, (ii) a preselected wavefield depth increment, and (iii) a square root of (1) a square of the transverse wavenumber of the selected one of the plurality of spatial locations subtracted from (2) a square of the function $k(x)$, to thereby define a multi-variable function $\hat{W}(k_x, k(x), \Delta z)$, wherein $k_x$ is the transverse wavenumber of the selected one of the plurality of spatial locations, $k(x)$ is a quotient of the temporal frequency and the space-variant velocity of the selected one of the plurality of spatial locations and $\Delta z$ is the preselected wavefield depth increment;

determining, by the computer in an eighth computer process, responsive to determining the multi-variable function $\hat{W}(k_x, k(x), \Delta z)$ in the seventh computer process, for the selected one of the plurality of spatial locations within the unfiltered wavefield, a product of (i) a quotient of one and a product of two and pi, and (ii) an integral over a set of real numbers, with respect to the transverse wavenumber of the selected one of the of the plurality of spatial locations, of a product of the multi-variable function $\hat{W}(k_x, k(x), \Delta z)$ and an exponential function of: (1) a product of negative square root of negative one, (2) the transverse wavenumber of the selected one of the plurality of spatial locations, and (3) a difference between the coordinate location of the selected one of the plurality of spatial locations and a coordinate location of a second one of the plurality of spatial locations where the second one of the plurality of spatial locations is located at a point closer to a boundary of the surface wave propagation zone than the selected one of the plurality of spatial locations, to thereby define a multi-variable function $W(x-x', k(x), \Delta z)$ wherein x' is the coordinate location of the second one of the plurality of spatial locations;

determining, by the computer in a ninth computer process, responsive to determining the multi-variable function $W(x-x', k(x), \Delta z)$ by the eighth computer process, a complex conjugate of the multi-variable function $W(x-x', k(x), \Delta z)$ to thereby define a multi-variable function $W^*(x-x', k(x), \Delta z)$; and determining, by the computer in a tenth computer process, responsive to determining the multi-variable function $W(x-x', k(x), \Delta z)$ in the eighth computer process and determining the multi-variable function $W^*(x-x', k(x), \Delta z)$ in the ninth computer process, an integral over a set of real numbers, with respect to the coordinate location of the selected one of the plurality of spatial location, of a product of $W(x-x', k(x), \Delta z)$ and $W^*(x-x', k(x), \Delta z)$ to thereby build a nonstationary convolution operator defined by a multi-variable function $P(x-x', k(x), \Delta z)$.

8. The computer implemented method of claim 7, wherein the step of extrapolating, by the computer in the third computer process the unfiltered wavefield at each of the plurality of spatial locations of the unfiltered wavefield to a depth level below the surface wave propagation zone of the seismic energy signals to thereby locally filter each of the plurality of spatial locations of the unfiltered wavefield further includes the steps of using, at each of the plurality of spatial locations, at least one of the plurality of nonstationary convolution operators built by the computer in the second computer process associated with that one of the plurality of spatial locations, and taking an integral over a set of real numbers of a product of the multi-variable function $P(x-x', k(x), \Delta z)$ and the unfiltered wavefield to thereby perform localized filtering of the selected one of the plurality of spatial locations.

9. The computer implemented method of claim 8, wherein the computer implemented method further includes the steps of:
receiving from a seismic image receiver at a recording surface a plurality of seismic energy signals that have propagated throughout a surface wave propagation zone; and
converting the plurality of seismic energy signals received from the seismic energy receiver into unfiltered, unsorted seismic image data.

10. A seismic image filtering machine to create a filtered seismic image on a display, the seismic image filtering machine comprising:
a first database storing unfiltered, unsorted seismic image data derived from a plurality of seismic energy signals received from a seismic energy receiver at a recording surface after propagating throughout a surface wave propagation zone;
a computer adapted to be in communication with the first database and having at least a processor, memory, and a display;
an unfiltered wavefield constructor computer readable program product stored in a tangible computer readable storage medium and including instructions that, when executed by the computer, cause the computer to perform the operation of constructing an unfiltered wavefield delineated by a plurality of spatial locations from the unfiltered, unsorted seismic image data stored in the first database;
a nonstationary convolution operator builder computer readable program product stored in a tangible computer readable storage medium and including instructions that, when executed by the computer, cause the computer to perform the operation of building, responsive to the unfiltered wavefield constructer computer readable program product, a plurality of nonstationary convolution operators, one for each of the plurality of spatial locations of the unfiltered wavefield;
a localized filter computer readable program product stored in a tangible computer readable storage medium and including instructions that, when executed by the computer, cause the computer to perform the operation of locally filtering each of the plurality of spatial locations of the unfiltered wavefield using, at each spatial locations, at least one of the plurality of nonstationary convolutions operators associated with that one of the plurality of spatial locations to thereby effectuate a single downward extrapolation of the unfiltered wavefield; and
a filtered seismic image creator computer readable program product stored in a tangible computer readable storage medium and including instructions that, when executed by the computer, cause the computer to perform the operation of creating, on the display, a filtered seismic image responsive to converting filtered seismic image data into a graphic image form capable of being displayed on the display, the filtered seismic image data being generated responsive to filtering in the localized filter computer readable program product the unfiltered wavefield at each of the plurality of spatial locations of the unfiltered wavefield, the filtered seismic image generated using the single downward extrapolation and without sorting the seismic image data.

11. The seismic image filtering machine of claim 10,
wherein each of the plurality of nonstationary convolution operators built by the nonstationary convolution operator builder computer readable program product is different from others of the plurality of nonstationary convolution operators and is uniquely associated with one of the plurality of spatial locations of the unfiltered wavefield;
wherein the operation of filtering by the localized filter computer program product responsive to the nonstationary convolution operator builder computer readable program product is implemented in one of, or both, a seismic energy source domain or a seismic energy receiver domain;

wherein the propagation zone includes complex geology and rugged topography; and wherein the unfiltered wavefield includes coherent seismic noise in the form of evanescent waves that have propagated throughout the surface wave proposition zone in complicated wave paths due to the complex geology and rugged topography within the propagation zone.

12. The seismic image filtering machine of claim 10, wherein the filtered image creator is further responsive to filtered seismic image data generated by attenuating coherent seismic noise from surface waves of an unfiltered wavefield constructed from unfiltered seismic image data through the single downward extrapolation of the unfiltered wavefield using a plurality of nonstationary convolution operators to perform localized filtering at each of a plurality of spatial locations of an unfiltered wavefield.

13. The seismic image filtering machine of claim 10, wherein each of the nonstationary convolution operators being based on a coordinate location of each of the plurality of spatial locations of the unfiltered wavefield and the space-variant velocity, temporal frequency, transverse wavenumber, and wavelength of the unfiltered wavefield at each spatial location.

14. The seismic image filtering machine of claim 10, wherein the nonstationary convolution operator builder computer readable program product further includes instructions that when executed by the computer cause the computer to perform the operations of:

determining, for a selected one of the plurality of spatial locations within the unfiltered wavefield, a space-variant velocity;

determining, for the selected one of the plurality of spatial locations within the unfiltered wavefield, a quotient of a temporal frequency and the space-variant velocity of the selected one of the plurality of spatial locations to thereby define a function k(x), wherein x is a selected one of the plurality of spatial locations and k(x) is a quotient of the temporal frequency and the space-variant velocity of the selected one of the plurality of spatial locations;

determining, for the selected one of the plurality of spatial locations within the unfiltered wavefield, an exponential function of a product of (i) a square root of negative one, (ii) a preselected wavefield depth increment, and (iii) a square root of (1) a square of the transverse wavenumber of the selected one of the plurality of spatial locations subtracted from (2) a square of the function k(x), to thereby define a multi-variable function $\hat{W}(k_x, k(x), \Delta z)$, wherein $k_x$ is the transverse wavenumber of the selected one of the plurality of spatial locations, k(x) is a quotient of the temporal frequency and the space-variant velocity of the selected one of the plurality of spatial locations and $\Delta z$ is the preselected wavefield depth increment;

determining, for the selected one of the plurality of spatial locations within the unfiltered wavefield, a product of (i) a quotient of one and a product of two and pi, and (ii) an integral over a set of real numbers, with respect to the transverse wavenumber of the selected one of the of the plurality of spatial locations, of a product of the multi-variable function $\hat{W}(k_x, k(x), \Delta z)$ and an exponential function of: (1) a product of negative square root of negative one, (2) the transverse wavenumber of the selected one of the plurality of spatial locations, and (3) a difference between the coordinate location of the selected one of the plurality of spatial locations and a coordinate location of a second one of the plurality of spatial locations, to thereby define a multi-variable function W(x-x', k(x), $\Delta z$), wherein x' is the coordinate location of the second one of the plurality of spatial locations; and determining an integral over a set of real numbers, with respect to the coordinate location of the selected one of the plurality of spatial location, of a product of the multi-variable function W(x-x', k(x), $\Delta z$) and a complex conjugate of the multi-variable function W(x-x', k(x), $\Delta z$) to thereby build a nonstationary convolution operator.

15. The seismic image filtering machine of claim 14, wherein the localized filter computer readable program product further includes instructions that when executed by the computer cause the computer to perform the operation of downward continuing the unfiltered wavefield at each of the plurality of spatial locations of the unfiltered wavefield to a depth level below the surface wave propagation zone of the seismic energy signals.

16. The seismic image filtering machine of claim 15,
wherein the unfiltered wavefield constructed by the unfiltered wavefield constructor computer readable program product has been Fourier transformed over a temporal coordinate; and wherein the localized filter computer readable program product further includes instructions that when executed by the computer cause the computer to perform the operation of generating, for each of the plurality of spatial locations of the unfiltered wavefield, filtered seismic image data responsive to filtering each of the plurality of spatial locations.

17. The seismic image filtering machine of claim 16, wherein the seismic image filtering machine further includes a nonstationary convolution operator stabilizer computer readable program product stored in a tangible computer readable storage medium and including instructions that, when executed by the computer, cause the computer to perform the operation of stabilizing each of the nonstationary convolution operators using a weighted least squares with a transition band approach.

18. A non-transitory computer readable program product stored in a tangible computer readable storage medium and including instructions that when executed by a computer cause the computer to perform the operations of:

constructing an unfiltered wavefield delineated by a plurality of spatial locations from unfiltered, unsorted seismic image data generated responsive to a plurality of seismic energy signals propagated through a surface wave propagation zone and received from a seismic image receiver;

building, for each of the plurality of spatial locations of the unfiltered wavefield, a plurality of nonstationary convolution operators, one for each of the plurality of spatial locations of the unfiltered wavefield;

filtering, in a space-frequency domain, each of the plurality of spatial locations of the unfiltered wavefield using, at each of the plurality of spatial locations, at least one of the plurality of nonstationary convolution operators associated with that one of the plurality of spatial locations; and generating a filtered seismic image on one or more output devices, each adapted to be in communication with the computer, responsive to each of the plurality of spatial locations of the unfiltered wavefield filtered in the space-frequency domain, the filtered seismic image generated using a single extrapolation and without sorting the seismic image data.

19. The computer readable program product of claim 18, wherein the operation of filtering in the space-frequency domain each of the plurality of spatial locations of the unfiltered wavefield is performed through a single downward extrapolation where the unfiltered wavefield at each of the plurality of spatial locations of the unfiltered wavefield is extrapolated to a depth level below the surface wave propagation zone of the seismic energy signals using the associated one of the plurality of nonstationary convolution operators.

20. The computer readable program product of claim 19, wherein each of the plurality of nonstationary convolution operators is different from others of the plurality of nonstationary convolution operators and is uniquely associated with one of the plurality of spatial locations of the unfiltered wavefield;
wherein the operation of filtering, in the space-frequency domain, is implemented in one of, or both, a seismic energy source domain or a seismic energy receiver domain;
wherein the propagation zone includes complex geology and rugged topography; and
wherein the unfiltered wavefield includes coherent seismic noise in the form of evanescent waves that have propagated throughout the surface wave proposition zone in complicated wave paths due to the complex geology and rugged topography within the propagation zone.

21. The computer readable program product of claim 20, wherein each of the nonstationary convolution operators being based on a coordinate location of each of the plurality of spatial locations of the unfiltered wavefield and a space-variant velocity, temporal frequency, transverse wavenumber, and wavelength of the unfiltered wavefield at each of the plurality of spatial locations.

22. The computer readable program product of claim 21, wherein the computer readable program product further including instructions that, when executed by the computer, cause the computer to perform the operations of:
performing a Fourier transformation of the unfiltered wavefield over a temporal coordinate;
stabilizing each of the nonstationary convolution operators using a weighted least squares with a transition band approach; and
generating filtered seismic image data for each of the plurality of spatial locations of the unfiltered wavefield responsive to filtering, in the space-frequency domain, each of the plurality of spatial locations of the unfiltered wavefield.

23. The computer readable program product of claim 22, wherein the computer readable program product further including instructions that, when executed by the computer, cause the computer to perform the operation of converting the filtered seismic image data into a graphic image capable of being transmitted by the computer to the one or more output devices adapted to be in communication with the computer; and
wherein the one or more output devices adapted to be in communication with the computer include one or more of: a printer, a brail printer, a television, a monitor, a CRT monitor, an LCD monitor, a plasma monitor, an OLED screen, a DLP monitor, a video projection, and a three-dimensional projection, a touch screen.

24. The computer readable program product of claim 23, wherein the operation of filtering, in a space-frequency domain, each of the plurality of spatial locations of the unfiltered wavefield further includes instructions that, when executed by the computer, cause the computer to perform the operations of:
determining, for a selected one of the plurality of spatial locations within the unfiltered wavefield, a space-variant velocity;
determining, for the selected one of the plurality of spatial locations within the unfiltered wavefield, a quotient of a temporal frequency and the space-variant velocity of the selected one of the plurality of spatial locations to thereby define a function k(x), wherein x is a selected one of the plurality of spatial locations and k(x) is a quotient of the temporal frequency and the space-variant velocity of the selected one of the plurality of spatial locations;
determining, for the selected one of the plurality of spatial locations within the unfiltered wavefield, an exponential function of a product of (i) a square root of negative one, (ii) a preselected wavefield depth increment, and (iii) a square root of (1) a square of the transverse wavenumber of the selected one of the plurality of spatial locations subtracted from (2) a square of the function k(x), to thereby define a multi-variable function $\hat{W}(k_x, k(x), \Delta z)$, wherein $k_x$ is the transverse wavenumber of the selected one of the plurality of spatial locations, k(x) is a quotient of the temporal frequency and the space-variant velocity of the selected one of the plurality of spatial locations and $\Delta z$ is the preselected wavefield depth increment;
determining, for the selected one of the plurality of spatial locations within the unfiltered wavefield, a product of (i) a quotient of one and a product of two and pi, and (ii) an integral over a set of real numbers, with respect to a transverse wavenumber of the selected one of the of the plurality of spatial locations, of a product of the multi-variable function $\hat{W}(k_x, k(x), \Delta z)$ and an exponential function of: (1) a product of negative square root of negative one, (2) the transverse wavenumber of the selected one of the plurality of spatial locations, and (3) a difference between the coordinate location of the selected one of the plurality of spatial locations and a coordinate location of a second one of the plurality of spatial locations, to thereby define a multi-variable function W(x-x', k(x), $\Delta z$), wherein x' is the coordinate location of the second one of the plurality of spatial locations; and
determining an integral over a set of real numbers, with respect to the coordinate location of the selected one of the plurality of spatial location, of a product of the multi-variable function W(x-x', k(x), $\Delta z$) and a complex conjugate of the multi-variable function W(x-x', k(x), $\Delta z$) to thereby build a nonstationary convolution operator.

* * * * *